(12) United States Patent
Bachmutsky et al.

(10) Patent No.: US 11,210,216 B2
(45) Date of Patent: Dec. 28, 2021

(54) TECHNIQUES TO FACILITATE A HARDWARE BASED TABLE LOOKUP

(71) Applicant: Intel Corporation, Santa Clara, CA (US)

(72) Inventors: Alexander Bachmutsky, Sunnyvale, CA (US); Raghu Kondapalli, San Jose, CA (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 16/452,173

(22) Filed: Jun. 25, 2019

(65) Prior Publication Data

US 2019/0310937 A1   Oct. 10, 2019

(51) Int. Cl.
*G06F 12/06* (2006.01)
(52) U.S. Cl.
CPC ...... *G06F 12/06* (2013.01); *G06F 2212/1024* (2013.01)
(58) Field of Classification Search
CPC .................... G06F 12/06; G06F 2212/1024
See application file for complete search history.

(56) References Cited

U.S. PATENT DOCUMENTS

| | | | | |
|---|---|---|---|---|
| 5,832,244 A * | 11/1998 | Jolley | ................... | G06F 13/385 710/305 |
| 7,739,398 B1 * | 6/2010 | Shabtay | ................ | H04L 47/125 709/232 |
| 2011/0302220 A1 * | 12/2011 | Marcella | ........... | G06F 16/24534 707/803 |
| 2013/0304988 A1 * | 11/2013 | Totolos, Jr. | ............. | G06F 13/28 711/114 |
| 2015/0074341 A1 * | 3/2015 | Marukame | .......... | G06F 12/0246 711/103 |
| 2015/0281102 A1 * | 10/2015 | Lee | ........................ | H04L 47/29 370/236 |
| 2016/0142316 A1 * | 5/2016 | Wang | ..................... | H04L 45/54 370/392 |
| 2017/0192921 A1 * | 7/2017 | Wang | ........................ | G06F 9/46 |
| 2017/0286337 A1 | 10/2017 | Wang et al. | | |

OTHER PUBLICATIONS

Extended European Search Report for Patent Application No. 20165304.5, dated Aug. 24, 2020, 10 pages.
Sam Siu: "QorIQ Platform DPAA Deep Dive", NXP, Jun. 1, 2012 (Jun. 1, 2012), XP55722724, Retrieved from the Internet: URL:https://www.nxp.com/files-static/training_pdf/FTF/2012/americas/WBNR_FTF12_NET_F0155.pdf.
Silas Boyd-Wickizer et al: "Reinventing Scheduling for Multicore Systems", USENIX, USENIX, The Advanced Computing Systems Association, Feb. 25, 2019 (Feb. 25, 2019), pp. 1-5, XP061027851, Retrieved from the Internet: URL:https://www.usenix.org/event/hotos09/tech/full_papers/boyd-wickizer/ boyd-wickizer.pdf.

* cited by examiner

*Primary Examiner* — Chie Yew
(74) *Attorney, Agent, or Firm* — Compass IP Law PC

(57) ABSTRACT

Techniques to facilitate a hardware based table look of a table maintained in or more types of memories or memory domains include examples of receiving a search request forwarded from a queue management device. Examples also include implementing table lookups to obtain a result and sending the result to an output queue of the queue management device for the queue management device to forward the result to a requestor of the search request.

10 Claims, 16 Drawing Sheets

Request Format 600

| Key Value 610 | RequestID 620 | ResultQ 630 |

*FIG. 6*

Table Entry Format 700

| Key Value 710 | Result 720 | OutQ 730 | Result Type 740 |

```
00 – Requestor Specific
01 – Next Key for Compound Search
02 – Callback Pointer
03 – Data Pointer
```

RECEIVE A SEARCH REQUEST FORWARDED FROM AN INPUT QUEUE OF A QUEUE MANAGEMENT DEVICE
*1302*

IMPLEMENT A TABLE LOOKUP OF A TABLE MAINTAINED IN A MEMORY DOMAIN HAVING A GROUPING OF MEMORY ADDRESSES, THE TABLE LOOKUP IMPLEMENTED BASED ON A KEY VALUE INDICATED IN THE SEARCH REQUEST
*1304*

OBTAIN A RESULT FROM AN ENTRY OF THE TABLE BASED ON THE KEY VALUE INDICATED IN THE SEARCH REQUEST MATCHING A KEY VALUE INDICATED IN THE ENTRY OF THE TABLE
*1306*

SEND THE RESULT TO A REQUESTOR FOR THE SEARCH REQUEST BY SENDING THE RESULT TO AN OUTPUT QUEUE OF THE QUEUE MANAGEMENT DEVICE, WHEREIN THE QUEUE MANAGEMENT DEVICE IS ARRANGED TO FORWARD THE RESULT TO THE REQUESTOR FROM THE OUTPUT QUEUE
*1308*

*FIG. 13*

Storage Medium 1400

*Computer Executable Instructions for 1300*

RECEIVE TABLE INFORMATION TO CREATE A TABLE TO BE MAINTAINED IN A MEMORY DOMAIN HAVING A GROUPING OF MEMORY ADDRESSES
*1602*

CAUSE THE TABLE TO BE CREATED IN THE MEMORY DOMAIN SUCH THAT THE TABLE INCLUDES A PLURALITY OF TABLE ENTRIES THAT INCLUDE A KEY VALUE, A RESULT, OR A RESULT TYPE, THE TABLE ACCESSIBLE TO LOOKUP CIRCUITRY
*1604*

RECEIVE QUEUE INFORMATION TO CONFIGURE QUEUES OF A QUEUE MANAGEMENT DEVICE, THE QUEUE MANAGEMENT DEVICE HAVING INPUT QUEUES TO RECEIVE SEARCH REQUESTS TO CAUSE THE TABLE LOOKUP OF THE TABLE BY THE LOOKUP CIRCUITRY AND HAVING OUTPUT QUEUES TO RECEIVE RESULTS OF THE TABLE LOOKUP
*1606*

CAUSE THE QUEUES OF THE QUEUE MANAGEMENT DEVICE TO BE CONFIGURED BASED ON THE QUEUE INFORMATION
*1608*

SEND QUEUE CONFIGURATION INFORMATION TO ONE OR MORE REQUESTORS OF THE SEARCH REQUESTS, THE QUEUE CONFIGURATION INFORMATION TO IDENTIFY THE INPUT QUEUES OF THE QUEUE MANAGEMENT DEVICE TO RECEIVE THE SEARCH REQUESTS TO CAUSE THE LOOKUP OF THE TABLE BY THE LOOKUP CIRCUITRY
*1610*

RECEIVE SCHEDULE INFORMATION TO CONFIGURE SCHEDULE LOGIC AT THE QUEUE MANAGEMENT DEVICE TO SCHEDULE THE SEARCH REQUESTS RECEIVED IN THE INPUT QUEUES OF THE QUEUE MANAGEMENT DEVICE
*1612*

CAUSE THE SCHEDULE LOGIC TO BE CONFIGURED BASED ON THE SCHEDULE INFORMATION
*1614*

*FIG. 16*

**Storage Medium *1700***

*Computer Executable Instructions for 1600*

*FIG. 17*

TECHNIQUES TO FACILITATE A HARDWARE BASED TABLE LOOKUP

TECHNICAL FIELD

Descriptions are generally related to techniques to facilitate a hardware based table lookup of tables maintained in one or more types of memory or memory domains.

BACKGROUND

Core-to-core ("C2C") communication is critical in many computer applications today such as packet processing, high-performance computing, machine learning, and data center/cloud workloads associated with execution of one or more applications. In chip multi-processor ("CMP") architectures, as the number of cores increases, C2C communication often becomes a limiting factor for performance scaling when workloads share data. On a general purpose platform, shared memory space between cores is often employed to realize efficient C2C communication. However, the need to carefully manage the shared memory space by software, together with the increase in hardware coherency traffic, tend to incur significant overhead. As a result, CPU cores and network-on-chip ("NoC") designs that share coherent caches typically experience substantially longer latency and higher data traffic, while expending considerable resources to carry-out communication-related work. This keeps CPU cores and NoCs from performing their intended data processing tasks without adding an undesirable amount of processing latency.

In general, software queues such as the classic Lamport algorithm are commonly used on CMP platforms to enable C2C communication. There are three types of overhead generated in these types of traditional software queues. The first type of overhead includes cycles consumed by queue structure maintenance and synchronization, as well as by flow control and management of shared memory. This first type of overhead may be referred to as control plane overhead. The second type of overhead includes cycles spent on moving of data from one core to another. This second type of overhead may be referred to as data plane overhead. The third type of overhead includes the timely and fair scheduling of corresponding communicating entities (including saving/restoring the required contexts) on sending and receiving cores. This third type may be referred to as scheduling overhead. The sum of control plane, data plane and scheduling overhead may equate to a total overhead required to transfer data across cores.

A solution to address high amounts of overhead associated with software queues is to eliminate use of software queues on CMP platforms and instead utilize hardware based queue management devices. These hardware based queue management devices may be referred to as hardware queue managers "HQMs" and also may be referred to as queue management devices ("QMDs"). Use of HQMs or QMDs for C2C communications may assist in reducing control plane, data plane and in some implementations even scheduling overhead as compared to use of software queues for C2C communications. In some examples, HQMs or QMDs may be arranged to assist in managing queues arranged to temporarily maintain data units. The data units may be data consumed or produced by applications executed on separate cores and then transferred between the separate cores via input/ingress queues and output/egress queues. HQMs or QMDs may have an internal memory arranged to support these input/ingress queues and output/egress queues.

BRIEF DESCRIPTION OF THE DRAWINGS

FIG. 6 illustrates an example request format.
FIG. 7 illustrates an example table entry format.
FIG. 13 illustrates an example first logic flow.
FIG. 14 illustrates an example first storage medium.
FIG. 16 illustrates an example second logic flow.
FIG. 17 illustrates an example second storage medium.

DETAILED DESCRIPTION

As mentioned in this disclosure, HQMs or QMDs may have an internal memory arranged to support input/ingress queues and output/egress queues. The internal memory is typically sized to hold a few thousand table entries to support these queues. In some examples, it may be desirable to integrate hardware (at least operationally) based table lookup logic with an HQM or QMD to enable an application executed by a core or a hardware block of a core (e.g., a field programmable gate array (FPGA) based accelerator) to request table lookups or searches of a multitude of tables. The multitude of tables may collectively have millions of table entries via which the hardware based table lookup logic may search and provide results to the requesting application or hardware block or even HQM or QMD to increase the accessible table sizes or lookup types (hash, (content address memory (CAM), ternary CAM (TCAM), tree, etc.) for their internal decision making. These millions of searchable table entries and different lookup types by the hardware based table lookup logic may be possible via an integration of the table lookup logic with an HQM or QMD. As a result of this integration, an amount of table entries and lookup types for hardware based table lookups may be exponentially expanded compared to using only an HQM or QMD for hardware based table lookups.

Figure 1:
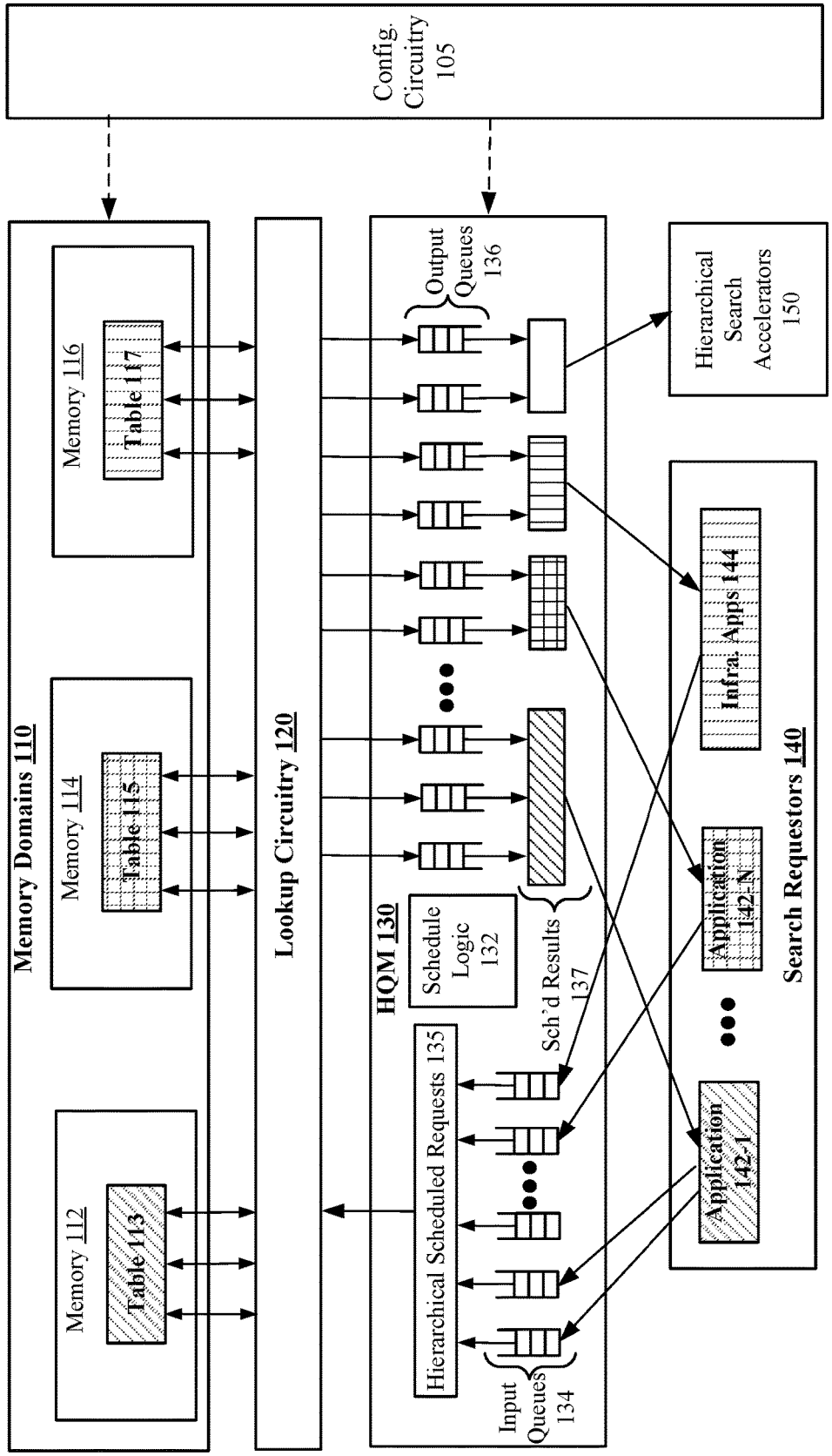
FIG. 1 illustrates an example first system.

FIG. 1 illustrates an example system 100. In some examples, as shown in FIG. 1, system 100 may include configuration circuitry 105, memory domains 110, lookup circuitry 120, a hardware queue manager (HQM) 130, search requestors 140, or hierarchical search accelerator(s) 150. Configuration circuitry 105 may include logic and/or features to enable a control plane access (e.g., to a user or operator) to configure tables accessible to lookup circuitry 120 and maintained in memory domains 110 and to also configure at least some resources of HQM 130 (e.g., queues and/or scheduler logic). As described in more detail below, configuration of these tables and/or resources of HQM 130 may enable lookup circuitry 120 to extend hardware based queue management capabilities of HQM 130 by significantly expanding on a number of table entries and lookup types that may be searched responsive to a search request.

According to some examples, as shown in FIG. 1, memory domains 110 includes memory 112, memory 114 and memory 116. For these examples, memory 112, memory 114 and memory 116 may host or maintain respective tables 113, 115 and 117. For simplicity, the term "table" is used, this term may represent various searchable data structures such as, but not limited to, a tree table data structure, a range table data structure, an array data structure, a link list data structure, an in-memory data structure (e.g., content addressable memory (CAM) or ternary CAM (TCAM)) or a storage-based database data structure (e.g., MySQL, Oracle® or others). Memories 112, 114 or 116 may represent separate memory domains (e.g., separate groupings of memory addresses) for a same or a different type of memory. Tables 113, 115 and 117 may includes separate searchable table entries via which logic and/or features of lookup circuitry 120 may utilize resources of HQM 130 to facilitate search requests from search requestors 140 to search these tables and facilitate delivery of results of these search requests. As shown in FIG. 1, tables 113, 115 and 117 have fill patterns that match fill patterns of search requestors included in search requestors 140 to indicate that a given search requestor is mapped to a given table for searching. For example, application 142-1 having a diagonal fill pattern is mapped to table 113 for application 142-1 to search table 113. Examples are not limited to mapping a single requestor to a single table as shown in FIG. 1. A single requestor may search multiple tables, and a single table may be searched by multiple requestors.

In some examples, tables 113, 115 or 117 may be a same or different type of searchable table. For example, a hash table, a TCAM table, a CAM table, a range table, an array, a link list, a database or a tree table. In some examples, it may be possible for logic and/or features of configuration circuitry 105 to map one or more input queues of HQM 130 included in input queues 134 or one or more output queues of HQM 130 included in output queues 136 to a table from among tables 113, 115 or 117. Based, at least in part, on this mapping, a requestor from among requestors 140 may use multiple queues of HQM 130 to access and receive search results from multiple tables. For example, application 142-1 may use the queues of output queues 136 pointing to the box of scheduled search results 137 having the diagonal fill pattern to receive search results. The scheduled search results 137, for example, scheduled by logic and/or features of HQM 130 such as schedule logic 132. In other examples, more flexible mapping methodologies may allow for arbitrary mapping based on flow settings of HQM 130 or may allow for an explicit table reference by search requestors 140 in their respective lookup or search requests. The search requests, for example, scheduled for handling by lookup circuitry 120 through input queues 134 by schedule logic 132 to generate hierarchical scheduled requests 135. Hierarchical scheduled requests 135 may be scheduled based, at least in part, on a hierarchy assigned (e.g., by configuration circuitry 105) to an application, tenant or queue associated with a search request.

According to some examples, hierarchical search accelerator(s) 150 may be capable of receiving a portion of scheduled search results 137 routed through output queues 136 of HQM 130. Different search accelerators from among hierarchical search accelerator(s) 150 may be distributed (e.g., to different tables from among tables 113, 115 or 117) and accessed in parallel, or may be chained to provide extra levels of a search. For example, access to additional tables (not shown) maintained in other memory domains than memory domains 110. These extra levels may be in addition to compound searches possible via searches involving multiple tables from among tables 113, 115 or 117. Hierarchical search accelerator(s) 150 may be another instance of lookup circuitry 120, an application specific integrated circuit (ASIC) or an FPGA arranged to facilitate these extra levels of a search.

In some examples, hierarchical search accelerator(s) 150 may create a hardware based search pipeline without extra intervention from search requestors 140. In other words, a search request is placed, the search continues through one or more tables of tables 113, 115 or 117 and then on to one or more search accelerators of hierarchical search accelerator(s) 150 via HQM 130. A final result is eventually reached and sent back to the requestor. For example, in a deployment of system 100 in a packet processing scenario, a first search accelerator may be dedicated to media access control (MAC) lookups or searches, a second search accelerator may be dedicated to internet protocol (IP) lookups or searches, a third search accelerator may be dedicated to layer 4 (L4) lookups or searches, or a fourth search accelerator may be dedicated to layer 7 (L7) flow lookups or searches.

According to some examples, as shown in FIG. 1, search requestors 140 may include applications 142-1 to 142-N, where "N" represents any whole, positive integer>1, and infrastructure applications 144. Applications 142-1 to 142-N may be executed by one or more cores of a multi-processor (CMP) architecture. Similarly, infrastructure may be executed by one or more cores of the CMP architecture. In other examples, applications 142-1 to 142-N may be implemented or executed by hardware logic running on an ASIC, an FPGA, or a mix of core(s), ASIC(s), and/or FPGA(s). Applications 142-1 to 142-N may include, but are not limited to, applications implemented to support one or more network functions (e.g., deep packet inspection, virus detection, data storage management, etc.). Infrastructure applications 144 may include, but are not limited to, virtual routers, virtual switches or virtual network interface cards. As described more below, a requestor such as application 142-1 may submit a search request through HQM 130 to lookup circuitry 120 to search a table maintained in a memory of memory domains 110. Depending on a result type, results of these search requests may be routed back through HQM 130 to the requestor or possibly routed to hierarchical search accelerator(s) 150 for one or more additional table searches that may include results from those additional searches being sent directly to the requestor.

Types of memory for which memories 112, 114 or 116 may be included in may include volatile types of memory such as, but not limited to, random-access memory (RAM), Dynamic RAM (DRAM), double data rate synchronous dynamic RAM (DDR SDRAM), static random-access memory (SRAM), ternary content-addressable memory (TCAM), thyristor RAM (T-RAM) or zero-capacitor RAM (Z-RAM). Types of memory may also include non-volatile types of memory such as, but not limited to, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thiristor based memory, a magnetoresistive random access memory (MRAM) that incorporates memristor technology, or spin transfer torque MRAM (STT-MRAM).

According to some examples, the term "data", as used herein, may refer to any type of binary, numeric, voice, video, textual, or script data, or any type of source or object code, or any other suitable information in any appropriate format that may be communicated from one point to another in a system, electronic devices and/or networks.

According to some examples, system 100 may be hosted by or coupled with a server. The server may be a server for a base transceiver station (BTS), a web server, a network server, an Internet server, a workstation. In other examples, system 100 may be hosted by or coupled with a minicomputer, a main frame computer, a supercomputer, a network appliance, a web appliance, a distributed computing system, multiprocessor systems, processor-based systems, or combination thereof.

Figure 2:
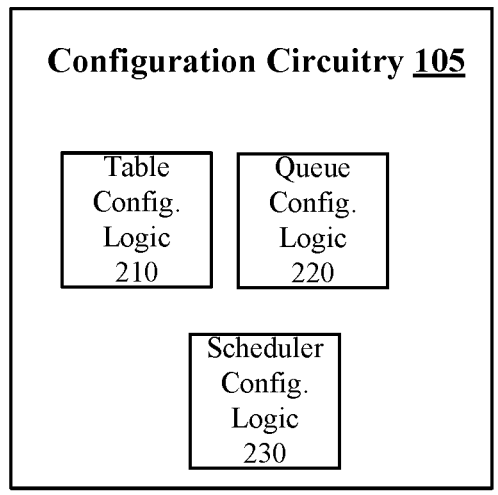
FIG. 2 illustrates an example of configuration circuitry.

FIG. 2 illustrates an example of configuration circuitry 105. According to some examples, as shown in FIG. 2, configuration circuitry 105 includes a table configuration logic 210, a queue configuration logic 220 and a scheduler configuration logic 230. As briefly mentioned above, configuration circuitry 105 may include logic and/or features to enable a control plane access to configure tables accessible to lookup circuitry 120 and maintained in memory domains 110 as shown in FIG. 1. The logic and/or features to configure these tables may include table configuration logic 210. Table configuration logic 210, for examples, may enable a user or operator to delete or update tables 113, 115 or 117. Table configuration logic 210 may also enable a user or operator to create new tables in memory 112, 114, 116 or in different memories included in memory domains 110.

Also, as mentioned briefly above, configuration circuitry 105 may include logic and/or features to enable a control plane access to configure as least some resources of HQM 130. The logic and/or features to configure these resources of HQM 130 may include queue configuration logic 220 and scheduler configuration logic 230. Queue configuration logic 220 may enable a user or operator to configure input and output queues of HQM 130 to facilitate the flow of requests and results for search requests placed by search requestors 140. This configuration may include, but is not limited to, assigning specific queues to tables and/or search requestors or allowing for search requests to indicate which queues to use for routing requests/results through HQM 130. Scheduler configuration logic 230 may enable a user or operator to configure or set policies for schedule logic 132 of HQM 130 to schedule requests to lookup circuitry 120 through input queues 134 or to schedule results pulled from tables 113, 115 and/or 117 by lookup circuitry 120 through output queues 136.

Figure 3:
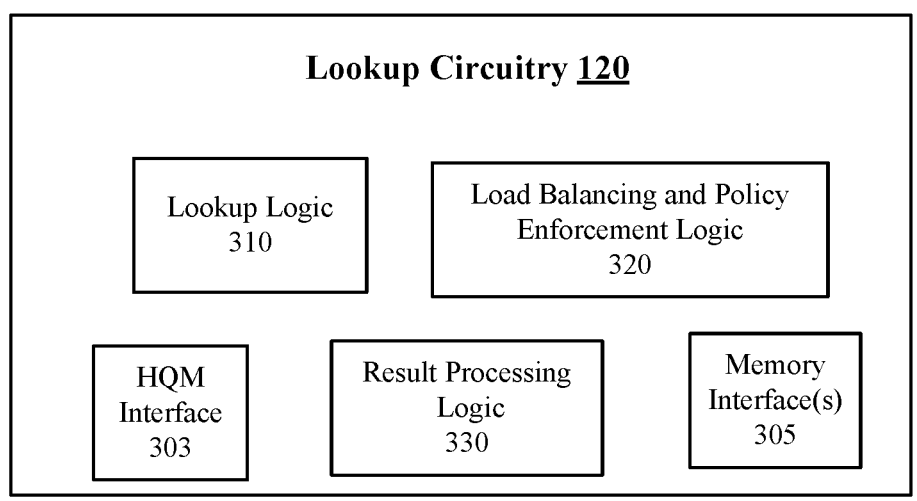
FIG. 3 illustrates an example of lookup circuitry.

FIG. 3 illustrates an example of lookup circuitry 120. In some examples, as shown in FIG. 3, lookup circuitry 120 includes an HQM interface 303, one or more memory interface(s) 305, a lookup logic 310, a load balancing and policy enforcement logic 320 and a result processing logic 330. HQM interface 303, may be a communication interface to receive search requests forwarded from input queues of HQM 130. Memory interface(s) 305 may be one or more different types of memory interfaces coupled with memories 112, 114 or 115 to enable logic and/or features to implement table lookups responsive to received search requests and to obtain results for these table lookups.

According to some examples, lookup logic 310 may perform table lookups of one or more tables maintained in memory domains 110 responsive to received search requests to obtain results from these table lookups based on information in the received search requests and based on table entries included in the one or more tables.

In some examples, load balancing and policy enforcement logic 320 may manage or control search requests to search the one or more tables such that table lookups are load balanced between the one or more tables and or between those placing the search requests. Load balancing and policy enforcement logic 320 may also enforce policies that may include, for example, rules or policies for load balancing table lookups or limiting a number of tables that may be searched with a single search request (e.g., a compound search request). Load balancing and policy enforcement logic 320 may also enforce policies related to an amount of time one or more table lookup can take before the table lookup(s) time out. Load balancing and policy enforcement logic 320 may also enforce policies based on prioritizing requests/results for some requestors over other requests/results for other requestors. For example, prioritizing requests/results for infrastructure applications 144 over requests for applications 142-1 to 142-N.

According to some examples, result processing logic 330 may process results obtained from table lookups by lookup logic 310. As described more below, table lookups may return result types that may be processed by result processing logic 330 to determine whether subsequent table looks are needed for a search request and/or other actions are needed for the search request.

Figure 4:
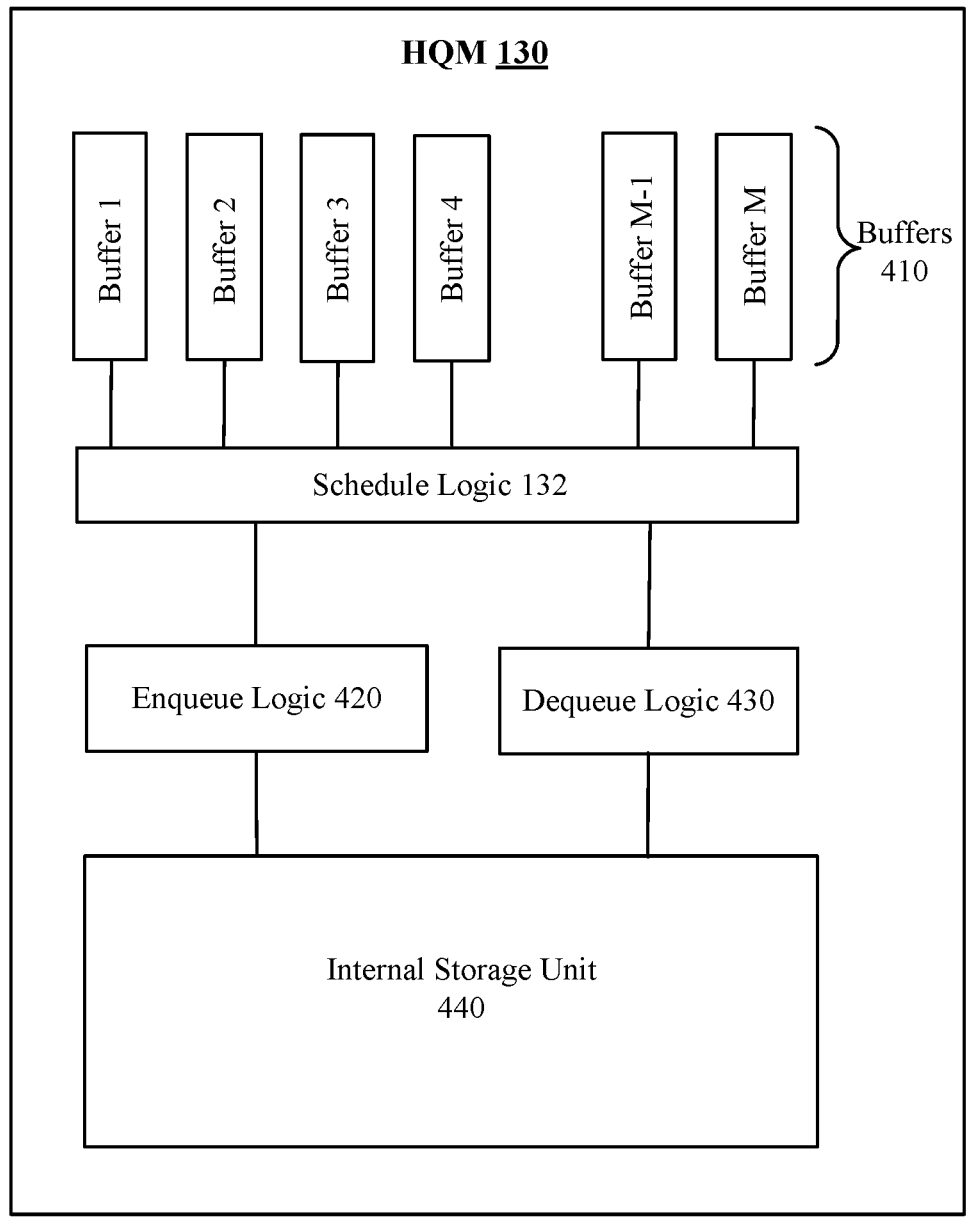
FIG. 4 illustrates an example of a hardware queue manager.

FIG. 4 illustrates an example of HQM 130. In some examples, as shown in FIG. 4, HQM 130 includes schedule logic 132, buffers 410, an enqueue logic 420, a dequeue logic 430 and an internal storage unit 440.

According to some examples, search requests/results sent from requestors 140 or lookup circuitry 120 may be received and temporarily stored to buffers 410. Search requests/results may be temporarily stored to buffers 410 because HQM 130 may not have enough resources or bandwidth to serve all the incoming search requests/results at the moment they are received. The buffers may be arranged as first in first out (FIFO) buffers where the first request/result into the buffer will be the first request/result out of the buffer. In some examples, a subset of buffers 410 may be allocated to store enqueue search requests while another subset is reserved for only dequeue search results. Other ways for allocating the buffers, such as by application or table, etc., may also be used. A single priority level may be assigned across all the buffers of buffers 410 to simplify implementation and to maximize throughput. Alternatively, multiple priority levels may be implemented to support fine-grained Quality of Service (QoS) features. For example, given n priorities, every enqueue and dequeue buffer pair may be assigned a different priority such that n buffers are allocated for enqueue search requests and n buffers are allocated for dequeue search results. Each search request/result has a priority that is either pre-assigned by a search requestor or assigned by schedule logic 132 upon receipt by HQM 130. Each search request/result is then stored in a buffer that corresponds to the search request's/result's priority (1-n) and/or type (enqueue or dequeue).

In some examples, schedule logic 132 chooses a buffer and selects one or more search requests/results from the head of the buffer. The buffer is chosen according to a scheduling policy. Various scheduling policies, such as Round Robin, Weighted Round Robin, preemptive priority, and a combination of these and other policies may be implemented. In a Round Robin policy, for example, the buffers are simply chosen sequentially, i.e. lowest buffer ID to the highest, or vice versa. If a chosen buffer is empty, schedule logic 132 selects from a different buffer. In a Weighted Round Robin policy, schedule logic 132 chooses and serves each buffer sequentially based on their associated priority. The ability to control the order in which to serve the buffers is called request-level flow control. After choosing a buffer and selecting one or more search requests/results from the head of the chosen buffer, schedule logic 132 schedules each selected request/result for execution by either enqueue logic 420 or dequeue logic 430 according to the search request/result type.

According to some examples, enqueue logic 420 and dequeue logic 430 read and write to internal storage unit 440 through dedicated ports. A search request executed by enqueue logic 420 causes one data item to be inserted into internal storage unit 440. A dequeue search result executed by the dequeue logic 430 causes one data item to be retrieved from internal storage unit 440 and sent to an output queue. If a search request/result cannot be executed by the enqueue or dequeue engine, it may be inserted back to the tail of a buffer of buffers 410 to be processed later. This reduces the chances of deadlocking a search request/result.

In some examples, internal storage unit 440 is used for storing queues and queue entries. It may be comprised of types of memory such as SRAM, DRAM, or any other suitable memory types. Internal storage unit 440 may be configurable to support any number of queues as well as different queue sizes.

Figure 5:
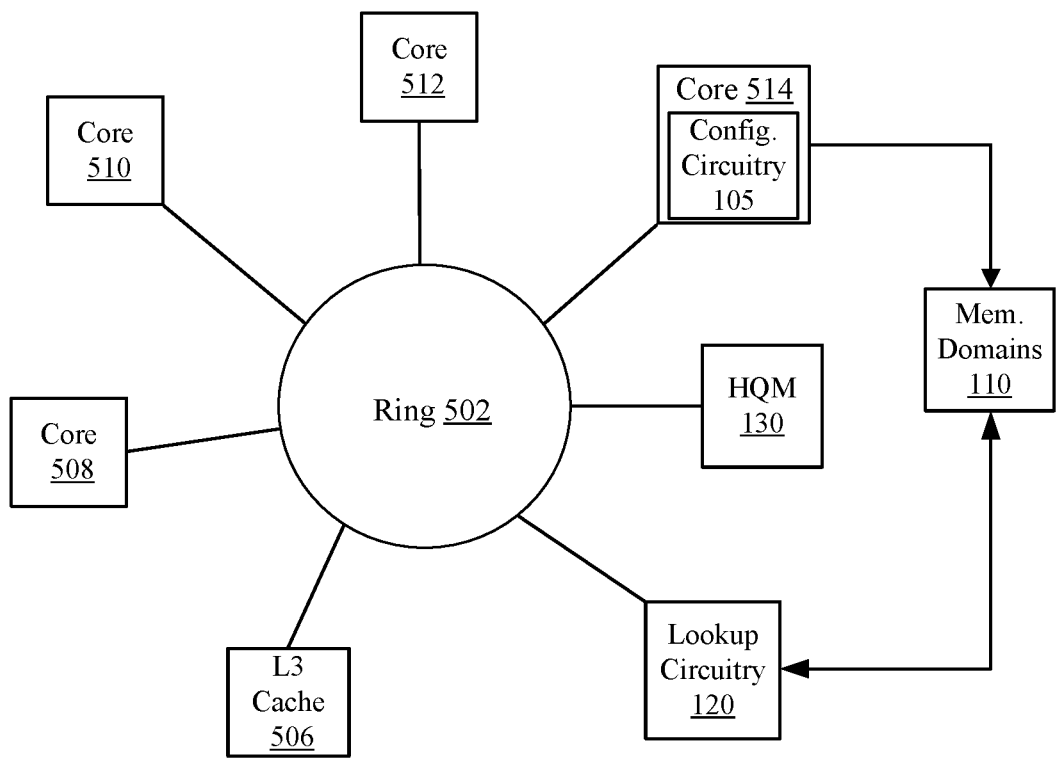
FIG. 5 illustrates an example second system.

FIG. 5 illustrates an example system 500. In some examples, system 500 shown in FIG. 5 depicts an example hardware-based system for enhanced table lookups. For these examples, level 3 (L3) cache 506, CPU cores 508, 510, 512, 514, lookup circuitry 120 and HQM 130 may be coupled together via ring 502. Ring 502 may serve as a high-speed or network-on-chip (NoC) interconnect to couple these elements of system 500 together. Although Ring 502 is shown as a network interconnect, other network interconnects may be contemplated to interconnected elements of system 500 such as, but not limited to, a mesh. Although not shown in FIG. 5, additional CPU cores, L3 caches, and/or other devices may be connected to the high speed interconnect of ring 502. Other devices may include, for example, one or more memory devices (e.g., dual in-line memory modules (DIMMs)) hosting memories included in memory domains 110.

According to some examples, search requests sent by applications executed by CPU cores 508, 510 or 512 may be routed through input queues of HQM 130 to reach lookup circuitry 120 via ring 502 to cause lookup circuitry 120 to search tables maintained in memories included in memory domains 110 accessible to lookup circuitry 120 (e.g., via one or more memory interfaces (not shown)). Also, subsequent results for these search requests may be routed through output queues of HQM 130 to the requesting applications. As shown in FIG. 5, in some examples, configuration circuitry 105 may be executed or hosted by CPU core 514. For these examples, logic and/or features of configuration circuitry such as queue configuration logic 220 or scheduler configuration logic 230, may configure input queues and schedule logic of HQM 130 to handle these search requests. Also, logic and/or features of configuration circuitry 105 such as table configuration logic 210 may configure the tables to be searched by lookup circuitry responsive to a search request. Examples are not limited to configuration circuitry 105 being executed by a CPU core. In other examples, configuration circuitry may be executed by multiple cores of a multi-core processor, by an ASIC or by an FPGA.

In some examples, CPU cores 508, 510, 512 and 514 may be CPU cores of various commercially available processors, including without limitation an AMD® Epyc®, Ryzen®, Athlon®, and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon® or Xeon Phi® processors; and similar processors.

FIG. 6 illustrates an example request format 600. In some examples, search requests sent by search requestors (e.g., search requestors 140) may send search requests to lookup circuitry (e.g., lookup circuitry 120) using example request format 600. As shown in FIG. 6, request format 600 includes key value 610, RequestID 620 and ResultQ 630.

In some examples, key value 610 of request format 600 may include information used by lookup circuitry to search tables. For these examples, key value 610 may include information for the lookup circuitry to identify what is to be searched for in tables maintained in memories included in memory domains accessible to the lookup circuitry. For example, a network address for a targeted destination or contact information for an individual or entity.

According to some examples, RequestID 620 may include information to identify a requestor and/or individual requests associated with each search request using example request format 600. RequestID 620, for example, may include a unique identifier assigned to a requestor (e.g., a universal unique identifier (QUID) or a global unique identifier (GUID)). RequestID 620 may also include additional identifier information (e.g., sequential numbers) to differentiate between multiple requests made by a same requestor.

In some examples, ResultQ 630 may include information to identify a specific input queue of an HQM (e.g., HQM 130) via which a result to a search request using example request format 600 is to be routed to a requestor. For examples where a queue of the HQM is identified or included in ResultQ 630, search requestors and/or tables may have been assigned or mapped to specified output queues of the HQM. Identification of these assigned input queues may facilitate routing of search requests results through HQM 130 to the requestor.

FIG. 7 illustrates an example table entry format 700. In some examples, tables maintained in memories of memory domains (e.g., table 113) may have entries in the example format of table entry format 700. As shown in FIG. 7, table entry format 700 includes key value 710, result 720, OutQ 730 and result type 740.

According to some examples, key value 710 may include information to match up with information included in a search request. Result 720 may include information to provide for a given table entry that has a key value that matches key value 710. For example, provide contact information for an individual (e.g., mailing address or phone number). OutQ 730, for example, may include information to identify a specific output queue of an HQM (e.g., HQM 130) via which a result to a search request is to be placed. In some examples, one or more output queues of the HQM 130 may be allocated or mapped to a table using example table entry format 700. Those allocated queues may be identified in OutQ 730.

In some examples, result type 740 may include information to indicate a result type. For example, as shown in FIG. 7, result types may include, but are not limited to, requestor specific, next key value for compound search, call back pointer or data pointer result types. Requestor specific may refer to a result that is returned, as is, to a requester that placed a search request and may be interpreted by the requestor. Next key value for compound search may point to another table entry that may be looked up by lookup circuitry in a same table or a different table, and the result 720 may be used as key value 610 for an internally generated compound lookup request. For example, a first result of a compound search may find an individual's phone number and a next key value for compound search type may indicate another key value to look up the individual's home address. Callback pointer, for example, may be a memory address of a function to use. The function to use, for example, may be to encrypt data to be sent to a target destination or individual. Data pointer, for example, may be a pointer to a memory address for a requestor to access, copy or send data. The memory associated with the memory address, for example, may be used for storing larger amounts of data that may not fit within a limited data space associated with result 720/

Figure 8:
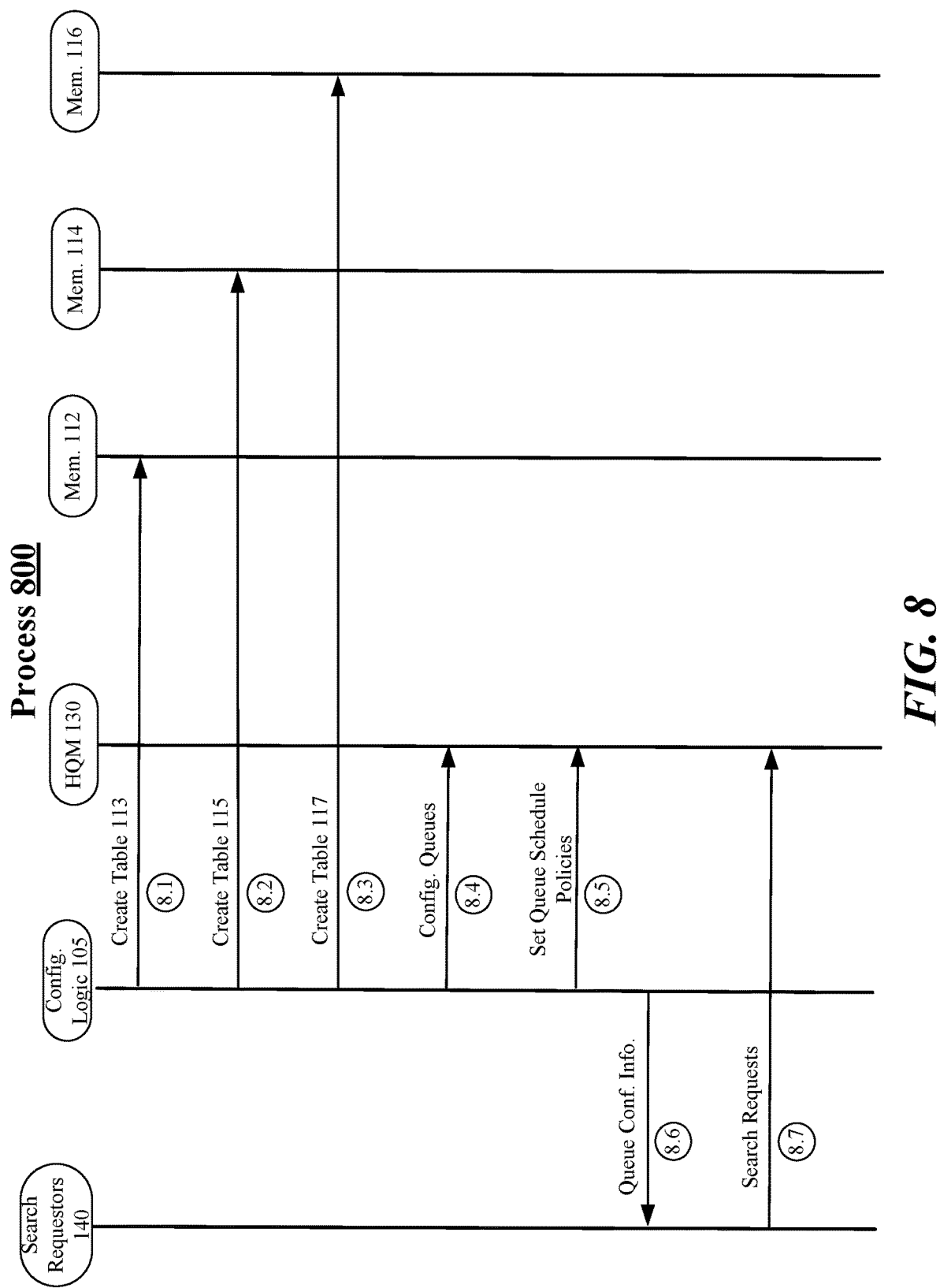
FIG. 8 illustrates an example first process.

FIG. 8 illustrates an example process 800. In some examples, process 800 may depict how logic and/or features of configuration circuity that may provide control plane access to configure searchable tables or elements of an HQM. For these examples, process 800 may include use of various elements shown in FIG. 1 such as configuration circuitry 105, memories 112, 114, 116, tables 113, 115, 117, lookup circuitry 120, HQM 130, search requestors 140 or hierarchical search accelerator(s) 150. Process 800 may also include use of various elements shown in FIGS. 2, 4 and 5 such as table configuration logic 210, queue configuration logic 220, scheduler configuration logic 230, schedule logic 132, enqueue logic 420, dequeue logic 430, internal storage unit 440 or CPU cores 508, 510, 512, 514. Process 800 may also include use example request format 600 shown in FIG. 6 or example table entry format 700 shown in FIG. 7. Examples are not limited to these elements or example formats shown in FIGS. 1, 2 and 4-7.

Beginning at process 8.1 (Create Table 113), logic and/or features of configuration circuitry 105 such as table configuration logic 210 may create table 113 to be maintained in memory 112. In some examples, table 113 may be created for and mapped to a particular requestor (e.g., a given application). For example, as shown in FIG. 1, table 113 may be created for conducting lookups or searches based on search requests from application 142-1. Table entries for table 113 may be in the example format of table entry format 700 as shown in FIG. 7 and described above. Examples are not limited to creating tables for lookups or searches by a single requestor.

Moving to process 8.2 (Create Table 115), logic and/or features of configuration circuitry 105 such as table configuration logic 210 may create table 115 to be maintained in memory 114. In some examples, table 115 may be created for and mapped to a particular requestor (e.g., a given application). For example, as shown in FIG. 1, table 115 may be created for conducting lookups or searches based on search requests from application 142-N. Table entries for table 115 may be in the example format of table entry format 700.

Moving to process 8.3 (Create Table 117), logic and/or features of configuration circuitry 105 such as table configuration logic 210 may create table 117 to be maintained in memory 116. In some examples, table 117 may be created for and mapped to a particular requestor (e.g., a given application). For example, as shown in FIG. 1, table 117 may be created for conducting lookups or searches based on search requests from infrastructure applications 144. Table entries for table 117 may be in the example format of table entry format 700. Process 800 may also include adding/deleting/modifying specific table entries in table 113, table 115, and/or table 117.

Moving to process 8.4 (Configure Queues), logic and/or features of configuration circuitry 105 such as queue configuration logic 220 may cause input and output queues of HQM 130 to be configured. In some examples, queue configuration logic 220 may configure the queues of HQM to facilitate a flow of requests and results placed by search requestors 140. For example, a first portion of output queues 136 may be configured to handle results returned from searching table 113 for a search request from application 142-1, a second portion of output queues 136 may be configured to handle results returned from searching table 115 for a search request from application 142-N or a third portion of output queues 136 may be configured to handle results returned from searching table 117 for a search request from infrastructure applications 144.

Moving to process 8.5 (Set Queue Schedule Policies), logic and/or features of configuration circuitry 105 such as scheduler configuration logic 230 may set queue schedule policies for the input and output queues of HQM 130. In some examples, queue schedule polices may direct schedule logic 132 of HQM 130 on how to schedule requests received from search requesters 140 and routed through input queues 134 to lookup circuitry 120. The queue schedule policies may also direct schedule logic 132 on how to schedule results sent from lookup circuitry 120 and received in output queues 136 for forwarding to search requestors 140 or forwarding to hierarchical search accelerator(s) 150 (e.g., for additional searches).

Moving to process 8.6 (Queue Configure Information), logic and/or features of configuration circuitry 105 such as queue configuration logic 220 may send queue configuration information to search requestors 140. In some examples, the queue configuration information may indicate what respective portions of input queues 134 have been configured to receive search requests sent from individual search requestors. The queue configuration information may also indicate what respective portions of output queues 136 have been configured to receive results for search requests made to respective tables 113, 115 or 117.

Moving to process 8.7 (Search Requests), search requestors 140 may send search requests to HQM. In some examples, the search requests may be in example request format 600. For these examples, a given search requestor may indicate in the search request what input queue was configured by queue configuration logic 220 of configuration circuitry 105 to receiving search requests from the given search requestor. Process 800 then comes to an end.

Figure 9:
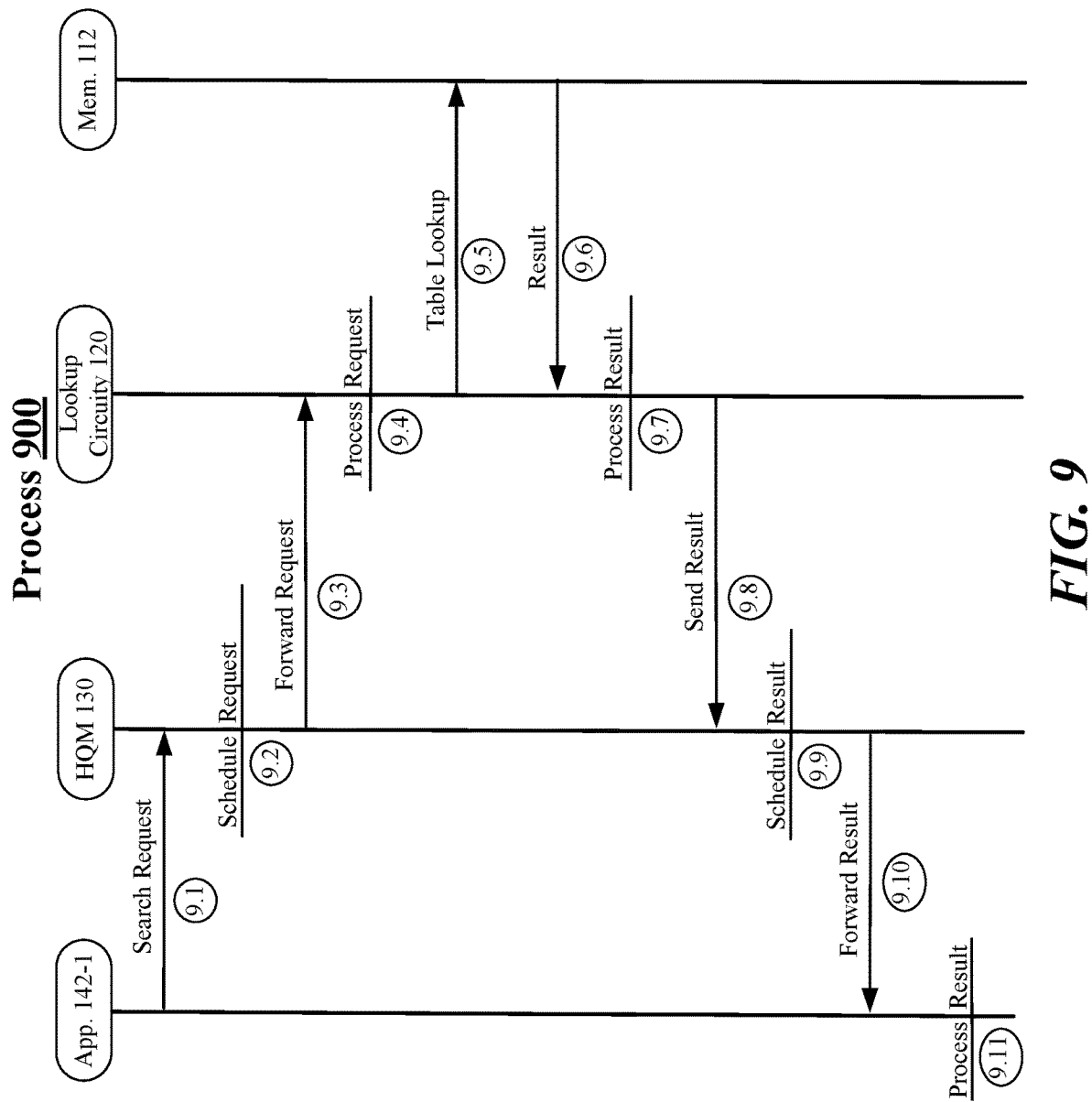
FIG. 9 illustrates an example second process.

FIG. 9 illustrates an example process 900. In some examples, process 900 may depict how a requestor may send a search request through an HQM to lookup circuitry to search a table maintained in a memory of a memory domain. For these examples, process 900 may include use of various elements shown in FIG. 1 such as memory 112, table 113, lookup circuitry 120, HQM 130 or application 142-1. Process 900 may also include use of various elements shown in FIGS. 3-5 such as HQM interface 303, memory interface(s) 305, lookup logic 310, load balancing and policy enforcement logic 320, result processing logic 330, schedule logic 132, enqueue logic 420, dequeue logic 430, internal storage unit 440 or CPU cores 508, 510, 512, 514. Process 900 may also include use example request format 600 shown in FIG. 6 or example table entry format 700 shown in FIG. 7. Examples are not limited to these elements or example formats shown in FIGS. 1 and 3-7.

Beginning at process 9.1 (Search Request), application 142-1 may send a search request to lookup circuitry 120 that is routed to an input queue of HQM 130. According to some examples, the search request may be in example request format 600. If, for example, a portion of the input queues of HQM 130 have been configured to receive search requests from application 142-1, the search request may indicate what input queue is to receive the search request.

Moving to process 9.2 (Schedule Request), logic and/or features of HQM 130 such as schedule 132 may schedule the request for forwarding to lookup circuitry 120. In some examples, the search request may be scheduled based on one or more policies. For example, first-in-first out, round-robin, weighted round-robin, preemptive priority, or a combination of these and other policies.

Moving to process 9.3 (Forward Request), logic and/or features of HQM 130 such as enqueue logic 420 may forward the search request to lookup circuitry 120.

Moving to process 9.4 (Process Request), logic and/or features of lookup circuitry 120 such as load balancing and policy enforcement logic 320 may process the search request received from application 142-1. In some examples, load balancing and policy enforcement logic 320 may monitor received search requests and determine a rate of table lookups to tables 113, 115 and 117 and may load balance search requests to prevent a disproportionate amount of table look ups to any single table compared to other tables. Load balancing and policy enforcement logic 320 may also monitor sources of the search requests and load balance search requests between various requestors. The load balancing, for example, may be based on one or more policies enforced by load balancing and policy enforcement logic 320. The policies may include, but are not limited to, assigning priority to some search requestors as compared to other search requestors.

Moving to process 9.5 (Table Lookup), logic and/or features of lookup circuitry 120 such as lookup logic 310 may implement a table lookup of table 113 maintained at memory 112. According to some examples, the table lookup may include lookup logic 310 using the key value information included in the search request received from application 142-1. Table 113, for example, may have entries according to table entry format 700.

Moving to process 9.6 (Result), a result found in table 113 maintained at memory 112 may be returned to lookup circuitry 120. In some examples, the key value indicated in the search request from application 142-1 matches a key value in a table entry of table 113. For these examples, a result, output queue for HQM 130 and a result type may be indicated in the found result returned from a table lookup of table 113. In some examples, there may be multiple results found and returned to lookup circuitry 120 in a single or multiple separate steps.

Moving to process 9.7 (Process Result), logic and/or features of lookup circuitry 120 such as result processing logic 330 may process the result to determine if any further actions are needed to complete the search request. In some examples, result processing logic 330 may determine that a result type for the result indicates that it is a requestor specific result type. For these examples, a requestor specific result type may indicate that no further table lookups are needed by logic and/or features of lookup circuitry 120. In other examples, result types indicating a callback pointer, or a data pointer may also indicate no further table looks are needed. In yet other examples, result type could indicate a need for a compound search that will trigger lookup circuitry 120 to generate another lookup request using, for example, the result field as a key value for the next lookup. In this example (not shown), the lookup circuitry 120 may continue processing of new lookup request from process 9.4 described above or returned it back to HQM 130 to be scheduled again with appropriate priority and policy.

Moving to process 9.8 (Send Result), logic and/or features of lookup circuitry 120 such as result processing logic 330 may cause the result(s) to be sent to an output queue maintained at HQM 130. In some examples, result processing logic 330 may send the result to an output queue indicated in the table entry of table 113 that returned the result.

Moving to process 9.9 (Schedule Result), logic and/or features of HQM 130 such as schedule logic 132 may schedule the result for forwarding to application 142-1. In some examples, the result may be scheduled based on one or more policies that may be the same or different policies than those used for scheduling search requests for forwarding to lookup circuitry 120.

Moving to process 9.10 (Forward Result), logic and/or features of HQM 130 such as dequeue logic 430 may forward the result to application 142-1. In alternate example, instead of or in addition to processes 9.9 and 9.10, application 142-1 may periodically check the result availability status of the HQM 130 queue specified in ResultQ field 630 in the search request 9.1 from the application 142-1

Moving to process 9.11 (Process Result), application 142-1 may process the received result. In some examples, processing the result may include, but is not limited to, requestor specific actions, using a callback pointer included in the result to implement a function or use a data pointer included in the result to obtain information from a memory address.

Figure 10:
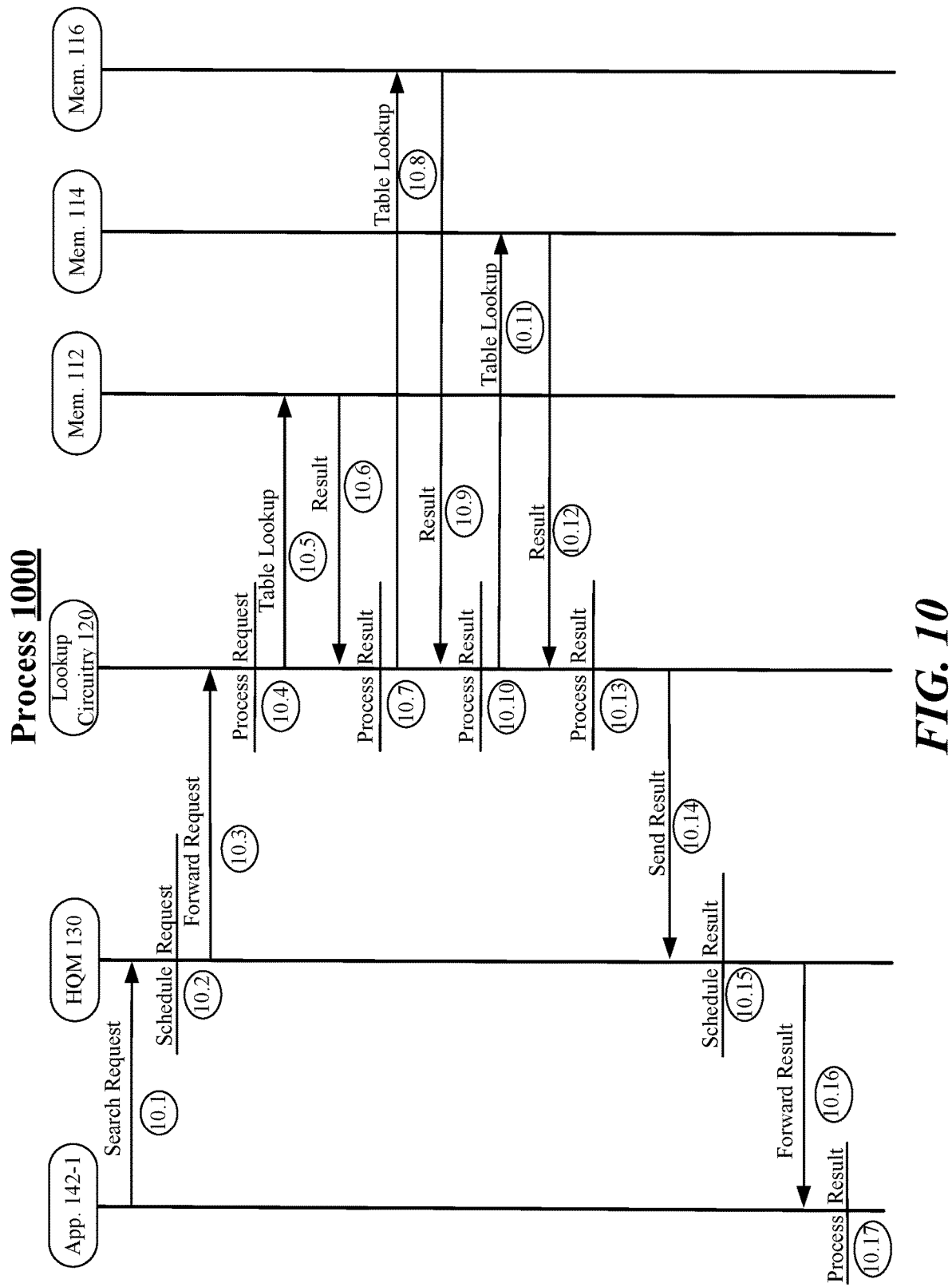
FIG. 10 illustrates an example third process.

FIG. 10 illustrates an example process 1000. In some examples, process 1000 may depict how a requestor may send a search request through an HQM to lookup circuitry to search multiple tables maintained in multiple memory domains (e.g., a compound search). For these examples, process 1000 may include use of various elements shown in FIG. 1 such as memories 112, 114, 116, tables 113, 115, 117, lookup circuitry 120, HQM 130 or application 142-1. Process 1000 may also include use of various elements shown in FIGS. 3-5 such as HQM interface 303, memory interface (s) 305, lookup logic 310, load balancing and policy enforcement logic 320, result processing logic 330, schedule logic 132, enqueue logic 420, dequeue logic 430, internal storage unit 440 or CPU cores 508, 510, 512, 514. Process 1000 may also include use example request format 600 shown in FIG. 6 or example table entry format 700 shown in FIG. 7. Examples are not limited to these elements or example formats shown in FIGS. 1 and 3-7.

Beginning at process 10.1 (Search Request), application 142-1 may send a search request to lookup circuitry 120 that is routed to an input queue of HQM 130.

Moving to process 10.2 (Schedule Request), logic and/or features of HQM 130 such as schedule 132 may schedule the request for forwarding to lookup circuitry 120.

Moving to process 10.3 (Forward Request), logic and/or features of HQM 130 such as enqueue logic 420 may forward the search request to lookup circuity 120.

Moving to process 10.4 (Process Request), logic and/or features of lookup circuitry 120 such as load balancing and policy enforcement logic 320 may process the search request received from application 142-1.

Moving to process 10.5 (Table Lookup), logic and/or features of lookup circuitry 120 such as lookup logic 310 may implement a table lookup of table 113 maintained at memory 112 based on a key value included in the search request.

Moving to process 10.6 (Result), a first result found in table 113 maintained at memory 112 based on a match of the key value included in the search request may be returned to lookup circuitry 120.

Moving to process 10.7 (Process Request), result processing logic 330 may process the first result to determine if any further actions are needed to complete the search request. In some examples, result processing logic 330 may determine that a result type for the first result indicates a next key value for a compound search.

Moving to process 10.8 (Table Lookup), lookup logic 310 may use the next key value for the compound search to do a lookup of table 115 maintained at memory 114 based on the next key value indicated in the first result.

Moving to process 10.9 (Result), a second result found in table 115 maintained at memory 114 based on a match of the next key value included in the first result may be returned to lookup circuitry 120.

Moving to process 10.10 (Process Result), result processing logic 330 may process the second result to determine if any further actions are needed to complete the search request. In some examples, result processing logic 330 may determine that a result type for the second result also indicates a next key value for a compound search.

Moving to process 10.11 (Table Lookup), lookup logic 310 may use the next key value for the compound search to do a lookup of table 117 maintained at memory 116 based on the next key value indicated in the second result.

Moving to process 10.12 (Result), a third result found in table 117 maintained at memory 116 based on a match of the next key value included in the second result may be returned to lookup circuitry 120.

Moving to process 10.13 (Process Result), result processing logic 330 may process the third result to determine if any further actions are needed to complete the search request. In some examples, result processing logic 330 may determine that a result type for the third result indicates that no further table lookup are needed. For example, a result type for the result indicates that it is requestor specific result type, or indicates a callback pointer, or indicates a data pointer. In alternative examples, rather than lookup circuitry 120 conducting subsequent table lookups of tables 115 and 117 as mentioned above for processes 10.8 and 10.11, lookup circuitry 120 may cause these subsequent table lookups to be scheduled with HQM 130 as separate new search requests (using the next key value as key value for the search request). These separate search requests may allow for more flexibility in scheduling all search requests being handled by lookup circuitry 120. In other words, lookup resources may be load balanced at a finer level if separate search requests can be schedule rather than allow for a single search request from application 142-1 to result in multiple table lookups by lookup circuitry 120.

Moving to process 10.14 (Send Result), result processing logic 330 may cause the third result to be sent to an output queue maintained at HQM 130. In some examples, result processing logic 330 may send the third result to an output queue indicated in the table entry of table 117 that returned the third result. In other examples, result processing logic 330 may send the third result to a queue indicated by ResultQ field 630 in the original search request 10.1 from application 142-1.

Moving to process 10.15 (Schedule Result), schedule logic 132 of HQM 130 may schedule the third result for forwarding to application 142-1. In an alternate example, instead of or in addition to processes 10.15 and 10.16, application 142-1 may periodically check the result availability status of the HQM 130 queue specified in ResultQ field 630 in the original search request 10.1 from application 142-1

Moving to process 10.16 (Forward Result), dequeue logic 430 of HQM 130 may forward the third result to application 142-1

Moving to process 10.17 (Process Result), application 142-1 may process the received result. Process 1000 may then come to an end.

Figure 11:
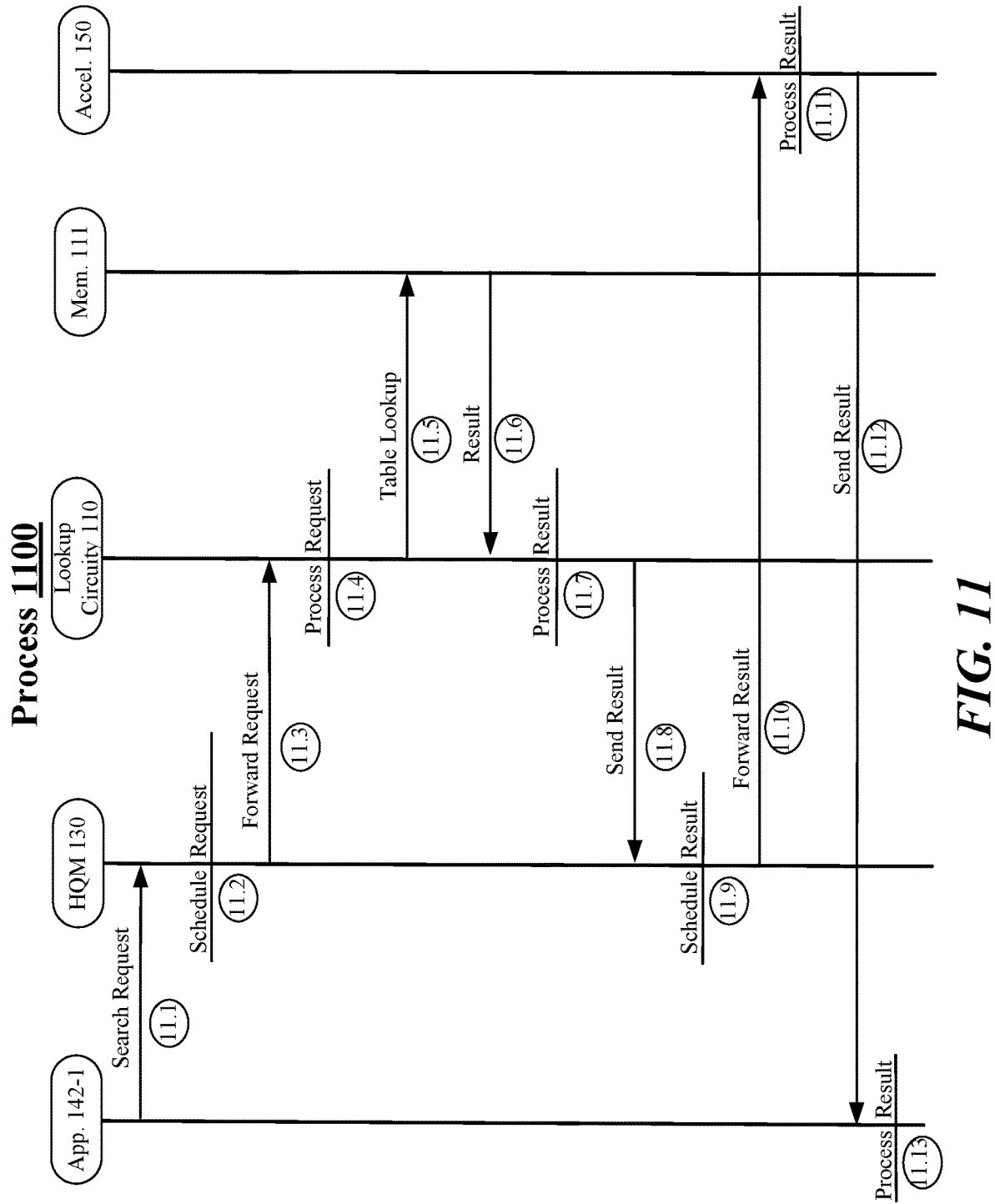
FIG. 11 illustrates an example fourth process.

FIG. 11 illustrates an example process 1100. In some examples, process 1100 may depict how a requestor may send a search request through an HQM to lookup circuitry to search a table maintained in a memory of a memory domain. Process 1100 also depicts how a result of the search request may lead to a result that causes a subsequent search using a hierarchical search accelerator. For these examples, process 1100 may include use of various elements shown in FIG. 1 such as memory 112, table 113, lookup circuitry 120, HQM 130, application 142-1 or hierarchical search accelerator(s) 150 Process 1100 may also include use of various elements shown in FIGS. 3-5 such as HQM interface 303, memory interface(s) 305, lookup logic 310, load balancing and policy enforcement logic 320, result processing logic 330, schedule logic 132, enqueue logic 420, dequeue logic 430, internal storage unit 440 or CPU cores 508, 510, 512, 514. Process 1100 may also include use example request format 600 shown in FIG. 6 or example table entry format 700 shown in FIG. 7. Examples are not limited to these elements or example formats shown in FIGS. 1 and 3-7.

Beginning at process 11.1 (Search Request), application 142-1 may send a search request to lookup circuitry 120 that is routed to an input queue of HQM 130.

Moving to process 11.2 (Schedule Request), logic and/or features of HQM 130 such as schedule 132 may schedule the request for forwarding to lookup circuitry 120.

Moving to process 11.3 (Forward Request), logic and/or features of HQM 130 such as enqueue logic 420 may forward the search request to lookup circuity 120.

Moving to process 11.4 (Process Request), logic and/or features of lookup circuitry 120 such as load balancing and policy enforcement logic 320 may process the search request received from application 142-1.

Moving to process 11.5 (Table Lookup), logic and/or features of lookup circuitry 120 such as lookup logic 310 may implement a table lookup of table 113 maintained at memory 112 based on a key value included in the search request.

Moving to process 11.6 (Result), a result may be returned to lookup circuitry 120. In some examples, the result may have been obtained from table 113 maintained at memory 112 based on a match of the key value included in the search request. In other examples, the result may be an indication that no match was found for any table entries for table 113, table 115 or table 117.

Moving to process 11.7 (Process Request), result processing logic 330 may process the result. In some examples, result processing logic 330 may determine that a result type for the first result indicates a next key value for a compound search. However, different from process 11.7, the next key value is for a table that is to be searched using a search accelerator included in hierarchical search accelerator(s) 150. A determination that the search accelerator is to conduct the search may be based on no table in memories 112, 114 or 116 having a key value match for the next key value. In other examples, where the result received indicates no table entry matches entries for table 113, 115, or 117, result processing logic 330 may determine that the search accelerator is to the conduct the search.

Moving to process 11.8 (Send Result), result processing logic 330 may cause the result to be sent to an output queue maintained at HQM 130. In some examples, result processing logic 330 may send the result to an output queue mapped or allocated to hierarchical search accelerator(s) 150.

Moving to process 11.9 (Schedule Result), schedule logic 132 of HQM 130 may schedule the result for forwarding to hierarchical search accelerator(s) 150.

Moving to process 11.10 (Forward Result), dequeue logic 430 of HQM 130 may forward the result to hierarchical search accelerator(s) 150.

Moving to process 11.11 (Process Result), hierarchical search accelerator(s) 150 may process the received result. In some examples, processing the received result may include using information included in the received result (e.g., a key value or a next key value for a compound search) to perform one or more table lookups to tables accessible to hierarchical search accelerator(s) 150.

Moving to process 11.12 (Send Result), hierarchical search accelerator(s) 150 may be capable of sending results to application 142-1.

Moving to process 11.13 (Process Result), application 142-1 may process the result received from hierarchical search accelerator(s) 150. Process 1100 may then come to an end. In some examples (not shown), hierarchical search accelerator(s) 150 may send result to the same or different instance of HQM 130 to be forwarded to yet another search accelerator from hierarchical search accelerator(s) 150.

Figure 12:
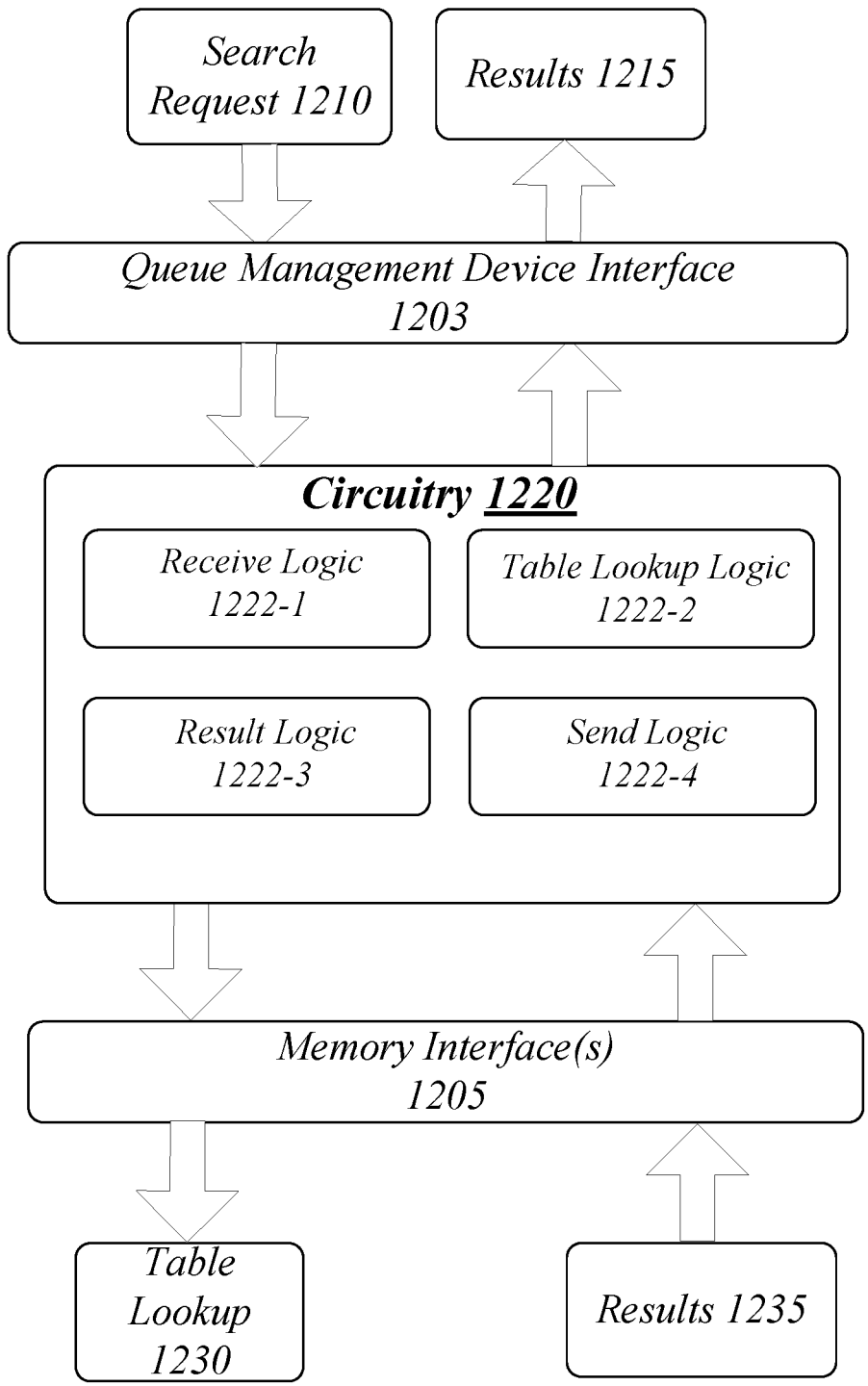
FIG. 12 illustrates an example first apparatus.

FIG. 12 illustrates an example block diagram for apparatus 1200. Although apparatus 1200 shown in FIG. 12 has a limited number of elements in a certain topology, it may be appreciated that the apparatus 1200 may include more or less elements in alternate topologies as desired for a given implementation.

According to some examples, apparatus 1200 may be supported by circuitry 1220. For these examples, circuitry 1220 may be an ASIC, FPGA, configurable logic, processor, processor circuit, or CPU. For these examples, the ASIC, FPGA, configurable logic, processor, processor circuit, or CPU may support logic and/or features of lookup circuity such as lookup circuitry 120 to facilitate table lookups responsive to search requests from requestors that are received from a hardware queue manager or queue management device. The table lookups to tables maintained in a memory domain accessible by logic and/or features of lookup circuitry 120. Circuitry 1220 may be arranged to execute one or more software or firmware implemented modules, components or logic 1222-*a* (module, component or logic may be used interchangeably in this context). It is worthy to note that "a" and "b" and "c" and similar designators as used herein are intended to be variables representing any positive integer. Thus, for example, if an implementation sets a value for a=4, then a complete set of software or firmware for modules, components or logic 1222-*a* may include logic 1222-1, 1222-2, 1222-3 or 1222-4. The examples presented are not limited in this context and the different variables used throughout may represent the same or different integer values. Also, "logic", "module" or "component" may also include software/firmware stored in computer-readable media, and although types of logic are shown in FIG. 12 as discrete boxes, this does not limit these types of logic to storage in distinct computer-readable media components (e.g., a separate memory, etc.).

According to some examples, as mentioned above, circuitry 1220 may include an ASIC, an FPGA, a configurable logic, a processor, a processor circuit, a CPU, or one or more cores of a CPU. Circuitry 1220 may be generally arranged to execute or implement components 1222-*a*. Circuitry 1220 may be all or at least a part of any of various commercially available processors.

According to some examples, apparatus 1200 may include a queue management device interface 1203. Apparatus 1200 may also include a receive logic 1222-1. Receive logic 1222-1 may be executed or supported by circuitry 1220 to receive, via queue management device interface 1203, a search request forwarded from an input queue of the queue management device. For these examples, the search request may be included in search request 1210.

In some examples, apparatus 1200 may include one or more memory interface(s) 1205. Also, apparatus 1200 may include a table lookup logic 1222-2. Table lookup logic 1222-2 may be executed or supported by circuitry 1220 to implement a table lookup of a table maintained in a memory domain having a grouping of memory addresses, the table lookup implemented based on a key value indicated in the search request. For these examples, the implemented table lookup may be initiated by table lookup 1230 routed through memory interface(s) 1205.

According to some examples, apparatus 1200 may include result logic 1222-3. Result logic 1222-3 may be executed or supported by circuitry 1220 to obtain a result from an entry of the table based on the key value indicated in the search request matching a key value indicated in the entry of the table. For these examples, the results may be included in results 1235 that may be received by results logic 1222-3 through memory interface(s) 1205.

In some examples, apparatus 1200 may include a send logic 1222-4. Send logic 1222-4 may be executed or supported by circuitry 1220 to send the result to a requestor of the search request by sending the result through queue management device interface 1203 to an output queue of the queue management device. For these examples, the queue management device is arranged to forward the result to the requestor from the output queue. The forwarded results may be included in results 1215.

Various components of apparatus 1200 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 13 illustrates an example logic flow 1300. Logic flow 1300 may be representative of some or all of the operations executed by one or more logic, features, or devices described herein, such as apparatus 1200. More particularly, logic flow 1300 may be implemented by at least receive logic 1222-1, table lookup logic 1222-2, result logic 1222-3 or send logic 1222-4.

According to some examples, logic flow 1300 at block 1302 may receive a search request forwarded from an input queue of a queue management device. For these examples, receive logic 1222-1 may receive the search request through queue management device interface 1203.

In some examples, logic flow 1300 at block 1304 may implement a table lookup of a table maintained in a memory domain having a grouping of memory addresses, the table lookup implemented based on a key value indicated in the search request. For these examples, table lookup logic 1222-2 may implement the table lookup.

According to some examples, logic flow 1300 at block 1306 may obtain a result from an entry of the table based on the key value indicated in the search request matching a key value indicated in the entry of the table. For these examples, result logic 1222-4 may obtain the result through memory interface(s) 1205.

In some examples, logic flow 1300 at block 1308 may send the result to a requestor of the search request by sending the result to an output queue of the queue management device, wherein the queue management device is arranged to forward the result to the requestor from the output queue. For these examples, send logic 1222-4 may send the result through queue management device interface 1203.

FIG. 14 illustrates an example storage medium 1400. In some examples, storage medium 1400 may be an article of manufacture. Storage medium 1400 may include any non-transitory computer readable medium or machine readable medium, such as an optical, magnetic or semiconductor storage. Storage medium 1400 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
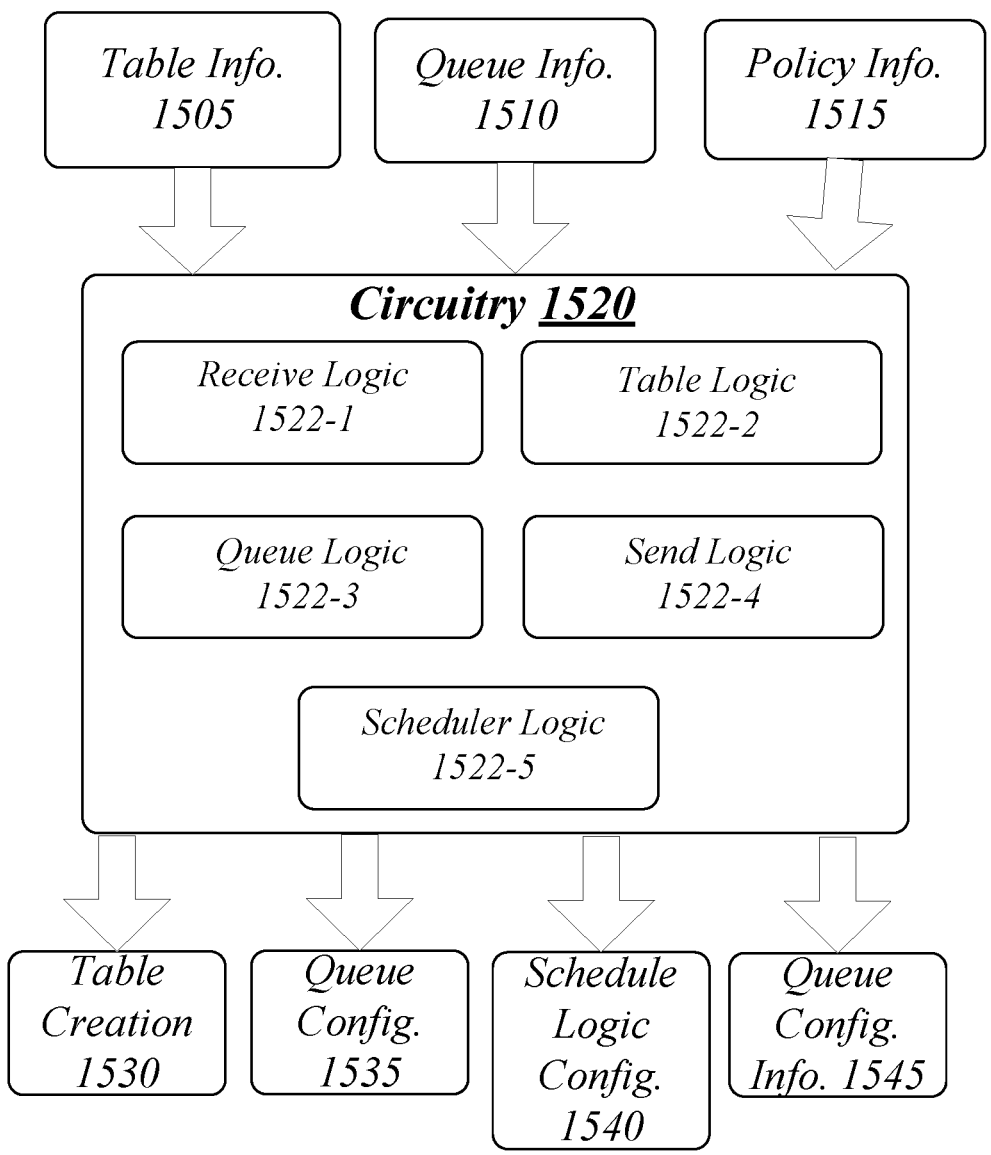
FIG. 15 illustrates an example second apparatus.

FIG. 15 illustrates an example block diagram for apparatus 1500. Although apparatus 1500 shown in FIG. 15 has a limited number of elements in a certain topology, it may be appreciated that the apparatus 1500 may include more or less elements in alternate topologies as desired for a given implementation.

According to some examples, apparatus 1500 may be supported by circuitry 1520. For these examples, circuitry 1520 may be an ASIC, FPGA, configurable logic, processor, processor circuit, or CPU. For these examples, the ASIC, FPGA, configurable logic, processor, processor circuit, or CPU may support logic and/or features of configuration circuitry such as configuration circuitry 105 to facilitate creation of tables maintained in one or more memory domains accessible to lookup circuitry such as lookup circuitry 120 and/or configure queues of a queue management device such as HQM 130 arranged to receive search requests to cause table lookups of created tables or receive results for those table lookups. Circuitry 1520 may be arranged to execute one or more software or firmware implemented modules, components or logic 1522-a (module, component or logic may be used interchangeably in this context). It is worthy to note that "a" and "b" and "c" and similar designators as used herein are intended to be variables representing any positive integer. Thus, for example, if an implementation sets a value for a=5, then a complete set of software or firmware for modules, components or logic 1522-a may include logic 1522-1, 1522-2, 1522-3, 1522-4 or 1522-5. The examples presented are not limited in this context and the different variables used throughout may represent the same or different integer values. Also, "logic", "module" or "component" may also include software/firmware stored in computer-readable media, and although types of logic are shown in FIG. 15 as discrete boxes, this does not limit these types of logic to storage in distinct computer-readable media components (e.g., a separate memory, etc.).

According to some examples, as mentioned above, circuitry 1520 may include an ASIC, an FPGA, a configurable logic, a processor, a processor circuit, a CPU, or one or more cores of a CPU. Circuitry 1520 may be generally arranged to execute or implement components 1522-a. Circuitry 1520 may be all or at least a part of any of various commercially available processors.

According to some examples, apparatus 1500 may a receive logic 1522-1. Receive logic 1522-1 may be executed or supported by circuitry 1520 to receive table information to create a table to be maintained in a memory domain having a grouping of memory addresses. For these examples, table information 1505 may be sent by a user or operator and may information to create the table. Table information 1505, in other examples, may include information to add/modify or delete a table or table entry.

In some examples, apparatus 1500 may include a table logic 1522-2. Table logic 1522-2 may be executed or supported by circuitry 1520 to cause the table to be created in the memory domain such that the table includes a plurality of table entries that include a key value, a result, or a result type, the table accessible to lookup circuitry. For these examples, table creation 1530 may include information to cause the creation of the table in the memory domain.

According to some examples, apparatus 1500 may include queue logic 1522-3. Queue logic 1522-3 may be executed or supported by circuitry 1520 to cause queues of a queue management device to be configured. The queue management device having input queues to receive search requests to cause the table lookup of the table by the lookup circuitry and having output queues to receive results of the table lookup. For these examples, the configuration of the queues may be based on queue information 1510 that was received by receive logic 1522.

Accord to some examples, apparatus 1500 may include a send logic 1522-4. Send logic 1522-4 may be executed or supported by circuitry 1520 to send queue configuration information to one or more requestors of the search requests, the queue configuration information to identify the input queues of the queue management device to receive the search requests to cause the lookup of the table by the lookup circuitry. For these examples, the queue configuration information may be included in queue configuration information 1545.

Accord to some examples, apparatus 1500 may include a scheduler logic 1522-5. Scheduler logic 1522-5 may be executed or supported by circuitry 1520 to cause a schedule logic at the queue management device to be configured to schedule the search requests received in the input queues of the queue management device. For these examples, configuration of the schedule logic at the queue management device may be based on policy information 1515 that was received by receive logic 1522.

Various components of apparatus 1500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 16 illustrates an example logic flow 1600. Logic flow 1600 may be representative of some or all of the operations executed by one or more logic, features, or devices described herein, such as apparatus 1500. More particularly, logic flow 1600 may be implemented by at least receive logic 1522-1, table logic 1522-2, queue logic 1522-3, send logic 1522-4 or scheduler logic 1522-5.

According to some examples, logic flow 1600 at block 1602 may receive table information to create a table to be maintained in a memory domain having a grouping of memory addresses. For these examples, receive logic 1522-1 may receive the table information.

In some examples, logic flow 1600 at block 1604 may cause the table to be created in the memory domain such that the table includes a plurality of table entries that include a key value, a result, or a result type, the table accessible to lookup circuitry. For these examples, table logic 1522-2 may cause the table to be created.

According to some examples, logic flow 1600 at block 1606 may receive queue information to configure queues of a queue management device, the queue management device having input queues to receive search requests to cause the table lookup of the table by the lookup circuitry and having output queues to receive results of the table lookup. For these examples, receive logic 1522-1 may receive the queue information.

In some examples, logic flow 1600 at block 1608 may cause the queues of the queue management device to be configured based on the queue information. For these examples, queue logic 1522-3 may cause the queues to be configured.

According to some examples, logic flow 1600 at block 1610 may send queue configuration information to one or more requestors of the search requests, the queue configuration information to identify the input queues of the queue management device to receive the search requests to cause the lookup of the table by the lookup circuitry. For these examples, send logic 1522-4 may send the queue configuration information.

In some examples, logic flow 1600 at block 1612 may receive schedule information to configure schedule logic at the queue management device to schedule the search requests received in the input queues of the queue management device. For these examples, receive logic 1522-1 may receive the schedule information.

According to some examples, logic flow 1600 at block 1614 may cause the schedule logic to be configured based on the schedule information. For these examples, scheduler logic 1522-5 may cause the schedule logic to be configured.

FIG. 17 illustrates an example storage medium 1700. In some examples, storage medium 1700 may be an article of manufacture. Storage medium 1700 may include any non-transitory computer readable medium or machine readable medium, such as an optical, magnetic or semiconductor storage. Storage medium 1700 may store various types of computer executable instructions, such as instructions to implement logic flow 1600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 18:
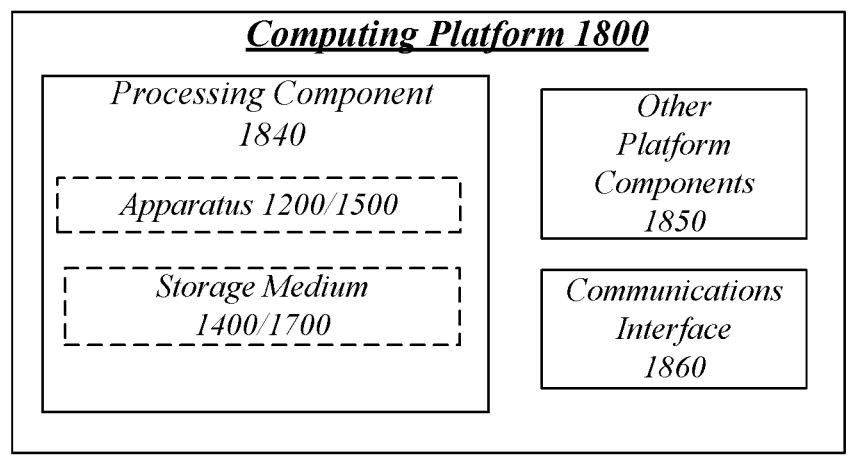
FIG. 18 illustrates an example computing platform.

FIG. 18 illustrates an example computing platform 1800. In some examples, as shown in FIG. 18, computing platform 1800 may include a processing components 1840, other platform components 1850 or a communications interface 1860.

According to some examples, processing components 1840 may execute or implement processing operations or logic for apparatus 1200/1500 and/or storage medium 1400/1700. Processing components 1840 may include various hardware elements, software elements, or a combination of both. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1850 may include common computing elements, memory units, chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1860 may include logic and/or features to support a communication interface. For these examples, communications interface 1860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1800 may be implemented in a server or client computing device. Accordingly, functions and/or specific configurations of computing platform 1800 described herein, may be included or omitted in various embodiments of computing platform 1800, as suitably desired for a server or client computing device.

The components and features of computing platform 1800 may be implemented using any combination of discrete circuitry, ASICs, logic gates and/or single chip architectures. Further, the features of computing platform 1800 may be implemented using microcontrollers, FPGAs and/or microprocessors or any combination of the foregoing where suitably appropriate. It is noted that hardware, firmware and/or software elements may be collectively or individually referred to herein as "logic" or "circuit."

It should be appreciated that the exemplary computing platform 1800 shown in the block diagram of FIG. 18 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" and may be similar to IP blocks. IP cores may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

Example 1. An example apparatus may include an interface coupled with a queue management device. The apparatus may also include circuitry to receive, via the interface, a search request forwarded from an input queue of the queue management device. The circuitry may also implement a table lookup of a table maintained in a memory domain having a grouping of memory addresses. The table lookup may be implemented based on a key value indicated in the search request. The circuitry may also obtain a result from an entry of the table based on the key value indicated in the search request matching a key value indicated in the entry of the table.

Example 2. The apparatus of example 1, the circuitry may also send the result to a requestor of the search request by sending the result through the interface to an output queue of the queue management device. The queue management device may be arranged to forward the result to the requestor from the output queue.

Example 3. The apparatus of example 2, the entry of the table may indicate the output queue of the queue management device to which the result is to be sent.

Example 4. The apparatus of example 1, the search request may indicate the input queue of the queue management device from which the search request is received.

Example 5. The apparatus of example 4, the input queue of the queue management device may be mapped to the table maintained in the memory domain such that the search request that indicates the input queue causes the table lookup of the table maintained in the memory domain.

Example 6. The apparatus of example 1, the entry of the table may indicate a result type for the result obtained from the entry, the result type to include a requestor specific result that causes the requestor to decide how to process the result, a callback pointer to a memory address to implement a function, or a data pointer to obtain information from a memory address.

Example 7. The apparatus of example 1, the table may be a hash table, a ternary table or a tree table.

Example 8. The apparatus of example 1, the circuitry may also cause a second table lookup of a second table maintained in a second memory domain having a second grouping of memory addresses based on the entry of the table indicating a result type for the result obtained from the entry that indicates a next key value for a compound search. The circuitry may also obtain a second result from an entry of the second table based on the next key value matching a key value indicated in the entry of the second table.

Example 9. The apparatus of example 8, the circuitry may also send the second result to a requestor of the search request by sending the second result through the interface to an output queue of the queue management device. The queue management device may be arranged to forward the second result to the requestor from the output queue.

Example 10. The apparatus of example 1, the circuitry may also cause a second table lookup based on the entry of the table indicating a result type for the result obtained from the entry that indicates a next key value for a compound search. The circuitry may also send the result to a search accelerator to implement the second table lookup based on the next key value not matching table entries for tables maintained in a plurality of memory domains accessible to the circuitry. The result may be sent through the interface to an output queue of the queue management device. The queue management device may be arranged to forward the result to the search accelerator.

Example 11. An example method may include receiving, at circuitry, a search request forwarded from an input queue of a queue management device. The method may also include implementing a table lookup of a table maintained in a memory domain having a grouping of memory addresses. The table lookup may be implemented based on a key value indicated in the search request. The method may also include obtaining a result from an entry of the table based on the key value indicated in the search request matching a key value indicated in the entry of the table.

Example 12. The method of example 11 may also include sending the result to a requestor of the search request by sending the result to an output queue of the queue management device. The queue management device may be arranged to forward the result to the requestor from the output queue.

Example 13. The method of example 12, the entry of the table may indicate the output queue of the queue management device to which the result is to be sent.

Example 14. The method of example 11, the search request may indicate the input queue of the queue management device from which the search request is received.

Example 15. The method of example 14, the input queue of the queue management device may be mapped to the table maintained in the memory domain such that the search request that indicates the input queue causes the table lookup of the table maintained in the memory domain.

Example 16. The method of example 11, the entry of the table may indicate a result type for the result obtained from the entry, the result type including a requestor specific result that causes the requestor to decide how to process the result, a callback pointer to a memory address to implement a function, or a data pointer to obtain information from a memory address.

Example 17. The method of example 11, the table may be a hash table, a ternary table or a tree table.

Example 18. The method of example 11 may also include causing a second table lookup of a second table maintained in a second memory domain having a second grouping of memory addresses based on the entry of the table indicating a result type for the result obtained from the entry that indicates a next key value for a compound search. The method may also include obtaining a second result from an entry of the second table based on the next key value matching a key value indicated in the entry of the second table.

Example 19. The method of example 18 may also include sending the second result to a requestor of the search request by sending the second result to an output queue of the queue management device. The queue management device may be arranged to forward the second result to the requestor from the output queue.

Example 20. The method of example 11 may also include causing a second table lookup based on the entry of the table indicating a result type for the result obtained from the entry that indicates a next key value for a compound search. The method may also include sending the result to a search accelerator to implement the second table lookup based on the next key value not matching table entries for tables maintained in a plurality of memory domains accessible to the circuitry. The result may be sent to an output queue of the queue management device, wherein the queue management device is arranged to forward the result to the search accelerator.

Example 21. An example at least one machine readable medium may include a plurality of instructions that in response to being executed by a system cause the system to carry out a method according to any one of examples 11 to 20.

Example 22. An example apparatus may include means for performing the methods of any one of examples 11 to 20.

Example 23. An example at least one machine readable medium may include a plurality of instructions that in response to being executed by a system, may cause the system to receive a search request forwarded from an input queue of a queue management device. The instructions may also cause the system to implement a table lookup of a table maintained in a memory domain having a grouping of memory addresses. The table lookup may be implemented based on a key value indicated in the search request. The instructions may also cause the system to obtain a result from an entry of the table based on the key value indicated in the search request matching a key value indicated in the entry of the table.

Example 24. The at least one machine readable medium of example 23, the instructions may also cause the system to send the result to a requestor of the search request by sending the result to an output queue of the queue management device. The queue management device may be arranged to forward the result to the requestor from the output queue.

Example 25. The at least one machine readable medium of example 24, the entry of the table may indicate the output queue of the queue management device to which the result is to be sent.

Example 26. The at least one machine readable medium of example 23, the search request may indicate the input queue of the queue management device from which the search request is received.

Example 27. The at least one machine readable medium of example 26, the input queue of the queue management device may be mapped to the table maintained in the memory domain such that the search request that indicates the input queue causes the table lookup of the table maintained in the memory domain.

Example 28. The at least one machine readable medium of example 23, the entry of the table may indicate a result type for the result obtained from the entry. The result type may include a requestor specific result that causes the requestor to decide how to process the result, a callback pointer to a memory address to implement a function, or a data pointer to obtain information from a memory address.

Example 29. The at least one machine readable medium of example 23, the table may be a hash table, a ternary table or a tree table.

Example 30. The at least one machine readable medium of example 23, the instructions may also cause the system to cause a second table lookup of a second table maintained in a second memory domain having a second grouping of memory addresses based on the entry of the table indicating a result type for the result obtained from the entry that indicates a next key value for a compound search. The instructions may also cause the system to obtain a second result from an entry of the second table based on the next key value matching a key value indicated in the entry of the second table.

Example 31. The at least one machine readable medium of example 30, the instructions may also cause the system to send the second result to a requestor of the search request by sending the second result to an output queue of the queue management device. The queue management device may be arranged to forward the second result to the requestor from the output queue.

Example 32. The at least one machine readable medium of example 23, the instructions may also cause the system to cause a second table lookup based on the entry of the table indicating a result type for the result obtained from the entry that indicates a next key value for a compound search. The instructions may also cause the system to send the result to a search accelerator to implement the second table lookup based on the next key value not matching table entries for tables maintained in a plurality of memory domains accessible to the system. The result may be sent to an output queue of the queue management device. The queue management device may be arranged to forward the result to the search accelerator.

Example 33. An example method may include receiving table information to create a table to be maintained in a memory domain having a grouping of memory addresses. The method may also include causing the table to be created in the memory domain such that the table includes a plurality of table entries that include a key value, a result, or a result type, the table accessible to lookup circuitry. The method may also include receiving queue information to configure queues of a queue management device, the queue management device having input queues to receive search requests to cause the table lookup of the table by the lookup circuitry and having output queues to receive results of the table lookup. The method may also include causing the queues of the queue management device to be configured based on the queue information.

Example 34. The method of example 33 may also include sending queue configuration information to one or more requestors of the search requests. The queue configuration information may identify the input queues of the queue management device to receive the search requests to cause the lookup of the table by the lookup circuitry.

Example 35. The method of example 33 may also include receiving schedule information to configure schedule logic at the queue management device to schedule the search requests received in the input queues of the queue management device. The method may also include causing the schedule logic to be configured based on the schedule information.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
an interface coupled with a queue management device utilized in core-to-core communications of an in chip multi-processor (CMP) architecture; and
circuitry to:
receive, via the interface, a search request forwarded from an input queue of the queue management device;
perform a table lookup of a table maintained in a memory domain having a grouping of memory addresses, the table lookup performed based on a key value indicated in the search request;
obtain a result from an entry of the table based on the key value indicated in the search request matching a key value indicated in the entry of the table;
cause a second table lookup based on the entry of the table indicating a result type for the result obtained from the entry, the result type indicating a next key value for a compound search; and
send the result, to a search accelerator to perform the second table lookup, based on the next key value not matching table entries for tables maintained in a plurality of memory domains accessible to the circuitry, the result sent through the interface to an output queue of the queue management device, wherein the queue management device is arranged to forward the result to the search accelerator.

2. The apparatus of claim 1, further comprising the search accelerator to send a second result from the second table lookup to a requestor of the search request.

3. The apparatus of claim 1, comprising the input queue of the queue management device is mapped to the table maintained in the memory domain, wherein the search request in the input queue causes the table lookup of the table maintained in the memory domain.

4. The apparatus of claim 1, the table comprising a hash table, a content addressable memory (CAM) table, a ternary CAM (TCAM) table, a range table, an array, a link list, a database or a tree table.

5. A method comprising:
receiving, at circuitry, a search request forwarded from an input queue of a queue management device utilized in core-to-core communications of an in chip multi-processor (CMP) architecture;
performing a table lookup of a table maintained in a memory domain having a grouping of memory addresses, the table lookup performed based on a key value indicated in the search request;
obtaining a result from an entry of the table based on the key value indicated in the search request matching a key value indicated in the entry of the table;
causing a second table lookup based on the entry of the table indicating a result type for the result obtained from the entry, the result type indicating a next key value for a compound search; and
sending the result, to a search accelerator to perform the second table lookup, based on the next key value not matching table entries for tables maintained in a plurality of memory domains accessible to the circuitry, the result sent through an interface to an output queue of the queue management device, wherein the queue management device is arranged to forward the result to the search accelerator.

6. The method of claim 5, further comprising the search accelerator to send a second result from the second table lookup to a requestor of the search request.

7. The method of claim 5, comprising the input queue of the queue management device is mapped to the table maintained in the memory domain, wherein the search request in the input queue causes the table lookup of the table maintained in the memory domain.

8. At least one non-transitory machine readable medium comprising a plurality of instructions that in response to being executed by a system, cause the system to:
receive a search request forwarded from an input queue of a queue management device utilized in core-to-core communications of an in chip multi-processor (CMP) architecture;
perform a table lookup of a table maintained in a memory domain having a grouping of memory addresses, the table lookup performed based on a key value indicated in the search request;

obtain a result from an entry of the table based on the key value indicated in the search request matching a key value indicated in the entry of the table;

cause a second table lookup based on the entry of the table indicating a result type for the result obtained from the entry, the result type indicating a next key value for a compound search; and send the result, to a search accelerator to perform the second table lookup, based on the next key value not matching table entries for tables maintained in a plurality of memory domains accessible to the system, the result sent through an interface to an output queue of the queue management device, wherein the queue management device is arranged to forward the result to the search accelerator.

9. The at least one non-transitory machine readable medium of claim 8, comprising the input queue of the queue management device is mapped to the table maintained in the memory domain, wherein the search request in the input queue causes the table lookup of the table maintained in the memory domain.

10. The at least one non-transitory machine readable medium of claim 8, further comprising the search accelerator to send a second result from the second table lookup to a requestor of the search request.

* * * * *